US011323744B2

(12) United States Patent
Gamei et al.

(10) Patent No.: US 11,323,744 B2
(45) Date of Patent: May 3, 2022

(54) DATA ENCODING AND DECODING

(71) Applicant: SONY GROUP CORPORATION, Tokyo (JP)

(72) Inventors: James Alexander Gamei, Surrey (GB); Karl James Sharman, Newbury (GB)

(73) Assignee: SONY GROUP CORPORATION, Tokyo (JP)

(*) Notice: Subject to any disclaimer, the term of this patent is extended or adjusted under 35 U.S.C. 154(b) by 896 days.

(21) Appl. No.: 14/909,686

(22) PCT Filed: Jul. 24, 2014

(86) PCT No.: PCT/GB2014/052262
§ 371 (c)(1),
(2) Date: Feb. 2, 2016

(87) PCT Pub. No.: WO2015/022488
PCT Pub. Date: Feb. 19, 2015

(65) Prior Publication Data

US 2016/0198194 A1 Jul. 7, 2016

(30) Foreign Application Priority Data

Aug. 15, 2013 (GB) ...................................... 1314612

(51) Int. Cl.
*H04N 19/625* (2014.01)
*G06F 17/14* (2006.01)
*H04N 19/122* (2014.01)
*H04N 19/156* (2014.01)

(52) U.S. Cl.
CPC ......... *H04N 19/625* (2014.11); *G06F 17/147* (2013.01); *H04N 19/122* (2014.11); *H04N 19/156* (2014.11)

(58) Field of Classification Search
CPC .... H04N 19/00; H04N 19/625; H04N 19/122; H04N 19/156; G06F 17/147
See application file for complete search history.

(56) References Cited

U.S. PATENT DOCUMENTS 8,374,237 B2 * 2/2013 Demos ................ H04N 19/136 375/240.03
2012/0177102 A1 7/2012 Bjontegaard et al.
(Continued)

FOREIGN PATENT DOCUMENTS

WO WO 2013/070605 A2 5/2013
WO WO 2014/167297 A1 10/2014

OTHER PUBLICATIONS

Sullivan, et al. "Overview of the High Efficiency Video Coding Standard." IEEE Transactions on Circuits and Systems for Video Technology, vol. 22, No. 12, Dec. 2012. (Year: 2012).*
(Continued)

*Primary Examiner* — Kyle M Lotfi
(74) *Attorney, Agent, or Firm* — Oblon, McClelland, Maier & Neustadt, L.L.P.

(57) ABSTRACT

A video data encoding method for encoding an array of video data values includes frequency-transforming the video data values according to a frequency transform, to generate an array of frequency-transformed values by a matrix-multiplication process using a transform matrix having a data precision greater than six bits.

11 Claims, 17 Drawing Sheets

Internal video bit depth = 14

(56) References Cited

U.S. PATENT DOCUMENTS

| | | | | |
|---|---|---|---|---|
| 2013/0114732 | A1 | 5/2013 | Dong et al. | |
| 2015/0016542 | A1* | 1/2015 | Rosewarne .......... | H04N 19/176 375/240.25 |

OTHER PUBLICATIONS

K. Sharman, et al., "AHG5: Range Extensions and High Bit Depths" Joint Collaborative Team on Video Coding (JCT-VC) of ITU-T SG 16 WP 3 and ISO/IEC JTC 1/SC 29/WG 11, JCTVC-M0178, 2013, pp. 1-21.
International Search Report dated Sep. 29, 2014, in PCT/GB2014/052262 Filed Jul. 24, 2014.
Kerofsky, et al., "Dynamic Range Analysis of HEVC/H.265 Inverse Transform Operations," Joint Collaborative Team on Video Coding (JCT-VC) of ITU-T SG16 WP3 and ISO/IEC JTC1/SC29/WG11; Jan. 2013, XP030113820, 10 pages.
Sharman, et al., "AHG 5 and 18: Internal Precision for High Bit Depths," Joint Collaborative Team on Video Coding (JCT-VC) of ITU-T SG 16 WP 3 and ISO/IEC JTC 1/SC 29/WG 11, 2013, XP030114677, 24 pages.
U.S. Appl. No. 14/355,143, filed Apr. 29, 2014, US2014/0307807, Gamei, et al.
U.S. Appl. No. 14/352,456, filed Apr. 17, 2014, US2014/0286417, Gamei, et al.
U.S. Appl. No. 14/394,834, filed Oct. 16, 2014, US2015/0063460, Gamei, et al.
U.S. Appl. No. 14/396,127, filed Oct. 22, 2014, US2015/0078447, Gamei, et al.
U.S. Appl. No. 14/523,637, filed Oct. 24, 2014, US2015/0043641, Gamei, et al.
U.S. Appl. No. 14/523,675, filed Oct. 24, 2014, US2015/0063457, Gamei, et al.
U.S. Appl. No. 14/396,983, filed Oct. 24, 2014, US2015/0117527, Gamei, et al.
U.S. Appl. No. 14/396,190, filed Oct. 22, 2014, US2015/0085924, Gamei, et al.
U.S. Appl. No. 14/396,979, filed Oct. 24, 2014, US2015/0172652, Gamei, et al.
U.S. Appl. No. 14/779,502, filed Sep. 23, 2015, Berry, et al.
U.S. Appl. No. 14/778,445, filed Sep. 18, 2015, Berry, et al.
U.S. Appl. No. 14/778,394, filed Sep. 18, 2015, Gamei, et al.
U.S. Appl. No. 14/902,266, filed Dec. 30, 2015, Gamei, et al.
U.S. Appl. No. 14/315,498, filed Jun. 26, 2014, US2015/0382003, Gamei, et al.

* cited by examiner $$\begin{vmatrix} a & b & c & d \\ c & c & e & -c \\ d & -a & -c & b \\ b & -d & c & -a \end{vmatrix}$$

FIG. 13

| | 6-bit |
|---|---|
| a | 29 |
| b | 55 |
| c | 74 |
| d | 84 |
| e | 0 |

FIG. 14

| | 6-bit | 7-bit | 8-bit | 9-bit | 10-bit | 11-bit | 12-bit | 13-bit | 14-bit |
|---|---|---|---|---|---|---|---|---|---|
| a | 29 | 58 | 116 | 232 | 464 | 928 | 1856 | 3712 | 7424 |
| b | 55 | 110 | 220 | 440 | 880 | 1760 | 3520 | 7040 | 14081 |
| c | 74 | 148 | 295 | 590 | 1181 | 2362 | 4723 | 9447 | 18893 |
| d | 84 | 168 | 336 | 672 | 1344 | 2688 | 5376 | 10753 | 21505 |
| e | 0 | 0 | 0 | 0 | 0 | 0 | 0 | 0 | 0 |

FIG. 17a

| | 15-bit | 16-bit | 17-bit | 18-bit | 19-bit |
|---|---|---|---|---|---|
| a | 14849 | 29698 | 59396 | 118791 | 237583 |
| b | 28162 | 56323 | 112647 | 225294 | 450588 |
| c | 37787 | 75573 | 151146 | 302292 | 604584 |
| d | 43011 | 86021 | 172043 | 344085 | 688170 |
| e | 0 | 0 | 0 | 0 | 0 |

FIG. 17b

| | 20-bit | 21-bit | 22-bit | 23-bit | 24-bit |
|---|---|---|---|---|---|
| a | 475165 | 950330 | 1900660 | 3801320 | 7602640 |
| b | 901175 | 1802350 | 3604700 | 7209400 | 14418800 |
| c | 1209169 | 2418337 | 4836675 | 9673350 | 19346700 |
| d | 1376340 | 2752680 | 5505360 | 11010720 | 22021440 |
| e | 0 | 0 | 0 | 0 | 0 |

FIG. 17c

| | 6-bit |
|---|---|
| a | 64 |
| b | 83 |
| c | 36 |
| d | 89 |
| e | 75 |
| f | 50 |
| g | 18 |
| h | 90 |
| i | 87 |
| j | 80 |
| k | 70 |
| l | 57 |
| m | 43 |
| n | 25 |
| o | 9 |
| p | 90 |
| q | 90 |
| r | 88 |
| s | 85 |
| t | 82 |
| u | 78 |
| v | 73 |
| w | 67 |
| x | 61 |
| y | 54 |
| z | 46 |
| A | 38 |
| B | 31 |
| C | 22 |
| D | 13 |
| E | 4 |

FIG. 16

| | 6-bit | 7-bit | 8-bit | 9-bit | 10-bit | 11-bit | 12-bit | 13-bit | 14-bit |
|---|---|---|---|---|---|---|---|---|---|
| a | 64 | 128 | 256 | 512 | 1024 | 2048 | 4096 | 8192 | 16384 |
| b | 83 | 166 | 332 | 665 | 1329 | 2658 | 5317 | 10633 | 21266 |
| c | 36 | 72 | 144 | 288 | 576 | 1153 | 2306 | 4612 | 9224 |
| d | 89 | 178 | 356 | 713 | 1426 | 2852 | 5703 | 11407 | 22813 |
| e | 75 | 150 | 301 | 601 | 1203 | 2406 | 4811 | 9622 | 19244 |
| f | 50 | 100 | 200 | 399 | 798 | 1596 | 3192 | 6385 | 12769 |
| g | 18 | 36 | 71 | 143 | 285 | 570 | 1141 | 2282 | 4563 |
| h | 90 | 181 | 361 | 722 | 1445 | 2890 | 5780 | 11560 | 23120 |
| i | 86 | 172 | 345 | 689 | 1379 | 2758 | 5516 | 11032 | 22063 |
| j | 80 | 160 | 320 | 639 | 1278 | 2556 | 5113 | 10225 | 20450 |
| k | 70 | 140 | 281 | 562 | 1123 | 2246 | 4493 | 8986 | 17972 |
| l | 57 | 114 | 229 | 458 | 915 | 1830 | 3660 | 7321 | 14642 |
| m | 43 | 87 | 174 | 347 | 694 | 1389 | 2777 | 5555 | 11109 |
| n | 25 | 50 | 101 | 201 | 403 | 806 | 1612 | 3223 | 6446 |
| o | 9 | 18 | 36 | 72 | 145 | 290 | 579 | 1158 | 2316 |
| p | 90 | 181 | 361 | 722 | 1444 | 2888 | 5777 | 11553 | 23106 |
| q | 90 | 179 | 357 | 714 | 1428 | 2856 | 5713 | 11426 | 22852 |
| r | 88 | 175 | 351 | 701 | 1403 | 2806 | 5611 | 11222 | 22445 |
| s | 85 | 171 | 341 | 683 | 1365 | 2731 | 5462 | 10924 | 21848 |
| t | 82 | 164 | 328 | 656 | 1312 | 2624 | 5249 | 10497 | 20995 |
| u | 77 | 155 | 310 | 619 | 1238 | 2476 | 4952 | 9905 | 19810 |
| v | 73 | 145 | 291 | 581 | 1163 | 2325 | 4650 | 9301 | 18601 |
| w | 67 | 134 | 268 | 536 | 1071 | 2143 | 4286 | 8571 | 17143 |
| x | 61 | 123 | 246 | 491 | 982 | 1965 | 3929 | 7859 | 15718 |
| y | 54 | 108 | 216 | 433 | 866 | 1732 | 3463 | 6927 | 13853 |
| z | 46 | 92 | 184 | 367 | 734 | 1469 | 2937 | 5875 | 11749 |
| A | 38 | 77 | 154 | 308 | 615 | 1231 | 2461 | 4923 | 9846 |
| B | 31 | 62 | 124 | 247 | 494 | 988 | 1977 | 3954 | 7908 |
| C | 22 | 44 | 87 | 174 | 348 | 697 | 1393 | 2787 | 5573 |
| D | 13 | 26 | 51 | 103 | 205 | 410 | 820 | 1641 | 3281 |
| E | 4 | 7 | 15 | 30 | 59 | 118 | 236 | 473 | 946 |

FIG. 18a

| | 15-bit | 16-bit | 17-bit | 18-bit | 19-bit |
|---|---|---|---|---|---|
| a | 32768 | 65536 | 131072 | 262144 | 524288 |
| b | 42532 | 85065 | 170129 | 340259 | 680517 |
| c | 18448 | 36896 | 73791 | 147582 | 295164 |
| d | 45627 | 91253 | 182507 | 365014 | 730028 |
| e | 38489 | 76977 | 153954 | 307909 | 615817 |
| f | 25538 | 51077 | 102153 | 204306 | 408612 |
| g | 9126 | 18252 | 36504 | 73009 | 146018 |
| h | 46240 | 92479 | 184958 | 369917 | 739833 |
| i | 44126 | 88253 | 176506 | 353011 | 706022 |
| j | 40901 | 81802 | 163603 | 327207 | 654413 |
| k | 35944 | 71887 | 143775 | 287550 | 575099 |
| l | 29283 | 58566 | 117132 | 234265 | 468530 |
| m | 22219 | 44437 | 88874 | 177749 | 355498 |
| n | 12892 | 25784 | 51569 | 103137 | 206275 |
| o | 4632 | 9264 | 18528 | 37057 | 74113 |
| p | 46212 | 92424 | 184849 | 369697 | 739394 |
| q | 45704 | 91407 | 182815 | 365630 | 731260 |
| r | 44890 | 89779 | 179559 | 359118 | 718236 |
| s | 43695 | 87391 | 174781 | 349562 | 699125 |
| t | 41990 | 83979 | 167959 | 335918 | 671836 |
| u | 39619 | 79239 | 158477 | 316955 | 633909 |
| v | 37202 | 74404 | 148808 | 297616 | 595233 |
| w | 34285 | 68570 | 137140 | 274281 | 548561 |
| x | 31436 | 62871 | 125743 | 251486 | 502971 |
| y | 27706 | 55412 | 110825 | 221650 | 443299 |
| z | 23498 | 46997 | 93993 | 187986 | 375972 |
| A | 19692 | 39384 | 78767 | 157535 | 315070 |
| B | 15816 | 31631 | 63263 | 126525 | 253051 |
| C | 11146 | 22292 | 44584 | 89168 | 178337 |
| D | 6562 | 13124 | 26248 | 52497 | 104993 |
| E | 1891 | 3782 | 7564 | 15129 | 30258 |

FIG. 18b

| | 20-bit | 21-bit | 22-bit | 23-bit | 24-bit |
|---|---|---|---|---|---|
| a | 1048576 | 2097152 | 4194304 | 8388608 | 16777216 |
| b | 1361035 | 2722070 | 5444140 | 10888280 | 21776560 |
| c | 590328 | 1180657 | 2361314 | 4722627 | 9445255 |
| d | 1460056 | 2920112 | 5840224 | 11680448 | 23360895 |
| e | 1231635 | 2463269 | 4926539 | 9853077 | 19706155 |
| f | 817225 | 1634450 | 3268899 | 6537799 | 13075597 |
| g | 292035 | 584070 | 1168141 | 2336282 | 4672564 |
| h | 1479667 | 2959333 | 5918667 | 11837334 | 23674667 |
| i | 1412045 | 2824090 | 5648179 | 11296358 | 22592717 |
| j | 1308827 | 2617653 | 5235307 | 10470613 | 20941227 |
| k | 1150199 | 2300397 | 4600795 | 9201590 | 18403179 |
| l | 937060 | 1874119 | 3748238 | 7496477 | 14992954 |
| m | 710995 | 1421991 | 2843981 | 5687962 | 11375925 |
| n | 412549 | 825098 | 1650196 | 3300393 | 6600785 |
| o | 148227 | 296454 | 592908 | 1185815 | 2371630 |
| p | 1478788 | 2957576 | 5915152 | 11830305 | 23660609 |
| q | 1462520 | 2925040 | 5850080 | 11700160 | 23400319 |
| r | 1436472 | 2872944 | 5745888 | 11491775 | 22983550 |
| s | 1398249 | 2796498 | 5592996 | 11185992 | 22371984 |
| t | 1343671 | 2687342 | 5374684 | 10749368 | 21498736 |
| u | 1267818 | 2535636 | 5071272 | 10142545 | 20285089 |
| v | 1190466 | 2380931 | 4761862 | 9523724 | 19047449 |
| w | 1097123 | 2194246 | 4388491 | 8776982 | 17553965 |
| x | 1005942 | 2011884 | 4023769 | 8047537 | 16095074 |
| y | 886598 | 1773197 | 3546394 | 7092787 | 14185574 |
| z | 751944 | 1503889 | 3007778 | 6015555 | 12031111 |
| A | 630139 | 1260278 | 2520556 | 5041112 | 10082224 |
| B | 506101 | 1012202 | 2024405 | 4048809 | 8097618 |
| C | 356674 | 713348 | 1426696 | 2853391 | 5706783 |
| D | 209987 | 419973 | 839947 | 1679894 | 3359787 |
| E | 60515 | 121030 | 242061 | 484122 | 968243 |

FIG. 18c $$
\begin{vmatrix}
a & a & a & a \\
b & c & -c & -b \\
a & -a & -a & a \\
c & -b & b & -c
\end{vmatrix}
$$

FIG. 19

$$
\begin{vmatrix}
a & a & a & a & a & a & a & a \\
d & e & f & g & -g & -f & -e & -d \\
b & c & -c & -b & -b & -c & c & b \\
e & -g & -d & -f & f & d & g & -e \\
a & -a & -a & a & a & -a & -a & a \\
f & -d & g & e & -e & -g & d & -f \\
c & -b & b & -c & -c & b & -b & c \\
g & -f & e & -d & d & -e & f & -g
\end{vmatrix}
$$

FIG. 20

$$
\begin{vmatrix}
a & a & a & a & a & a & a & a & a & a & a & a & a & a & a & a \\
h & i & j & k & l & m & n & o & -o & -n & -m & -l & -k & -j & -i & -h \\
d & e & f & g & -g & -f & -e & -d & -d & -e & -f & -g & g & f & e & d \\
i & l & o & -m & -j & -h & -k & -n & n & k & h & j & m & -o & -l & -i \\
b & c & -c & -b & -b & -c & c & b & b & c & -c & -b & -b & -c & c & b \\
j & o & -k & -i & -n & l & h & m & -m & -h & -l & n & i & k & -o & -j \\
e & -g & -d & -f & f & d & g & -e & -e & g & d & f & -f & -d & -g & e \\
k & -m & -i & o & h & n & -j & -l & l & j & -n & -h & -o & i & m & -k \\
a & -a & -a & a & a & -a & -a & a & a & -a & -a & a & a & -a & -a & a \\
l & -j & -n & h & -o & -i & m & k & -k & -m & i & o & -h & n & j & -l \\
f & -d & g & e & -e & -g & d & -f & -f & d & -g & -e & e & g & -d & f \\
m & -h & l & n & -i & k & o & -j & j & -o & -k & i & -n & -l & h & -m \\
c & -b & b & -c & -c & b & -b & c & c & -b & b & -c & -c & b & -b & c \\
n & -k & h & -j & m & o & -l & i & -i & l & -o & -m & j & -h & k & -n \\
g & -f & e & -d & d & -e & f & -g & -g & f & -e & d & -d & e & -f & g \\
o & -n & m & -l & k & -j & i & -h & h & -i & j & -k & l & -m & n & -o
\end{vmatrix}
$$

FIG. 21

DATA ENCODING AND DECODING

CROSS REFERENCE TO RELATED APPLICATION

The present application claims the benefit of the earlier filing date of GB1314612.1, filed at the United Kingdom Intellectual Property Office on 15 Aug. 2013, the entire content of which is incorporated herein by reference.

BACKGROUND

1. Field of the Invention

This disclosure relates to data encoding and decoding.

2. Description of the Related Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present disclosure.

There are several video data compression and decompression systems which involve transforming video data into a frequency domain representation, quantising the frequency domain coefficients and then applying some form of entropy encoding to the quantised coefficients.

The transformation into the spatial frequency domain at the encoder side corresponds to an inverse transformation at the decoder side. Example transformations include the so-called discrete cosine transformation (DCT) and the so-called discrete sine transformation (DST). In some examples the transformations are carried out by matrix-multiplying an array of input samples (derived from the video data to be coded) by a matrix of transformation coefficients to generate frequency-transformed data. Frequency-transformed data is converted back to sample data, from which output video data can be derived, by matrix-multiplying an array of the frequency-transformed data by a matrix of inverse-transformation coefficients.

Some standards and draft standards, such as the so-called High Efficiency Video Coding (HEVC) standards, define the spatial frequency transformation by defining the matrix of inverse-transformation coefficients to be used as the decoding side.

SUMMARY

This disclosure provides a data encoding method according to claim 1.

Further respective aspects and features are defined in the appended claims.

It is to be understood that both the foregoing general description and the following detailed description are exemplary, but not restrictive of, the present disclosure.

BRIEF DESCRIPTION OF THE DRAWINGS

A more complete appreciation of the disclosure and many of the attendant advantages thereof will be readily obtained as the same becomes better understood by reference to the following detailed description of embodiments, when considered in connection with the accompanying drawings, wherein:

FIG. 13 schematically illustrates a 4×4 DST transform matrix;

FIG. 14 schematically illustrates coefficient values for an inverse transform according to the matrix of FIG. 13;

FIG. 16 schematically illustrates coefficient values for an inverse transform according to the matrix of FIG. 13;

FIGS. 17*a* to 17*c* schematically illustrate coefficient values for a forward transform according to the matrix of FIG. 13;

FIGS. 18*a* to 18*c* schematically illustrate coefficient values for a forward transform according to the matrix of FIG. 15;

FIGS. 19 to 21 schematically illustrate the subsampling of coefficient values from the matrix of FIG. 15.

DESCRIPTION OF THE EMBODIMENTS

Figure 1:
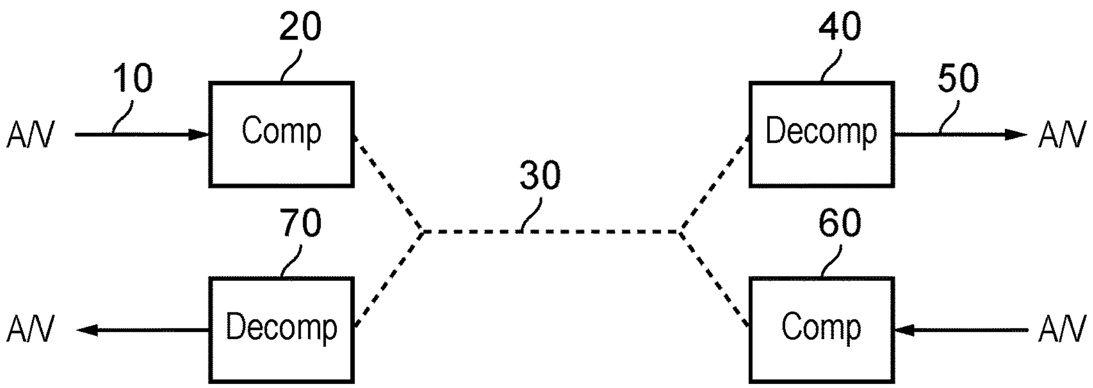
FIG. 1 schematically illustrates an audio/video (AN) data transmission and reception system using video data compression and decompression.

Referring now to the drawings, FIGS. 1-4*e* are provided to give schematic illustrations of apparatus or systems making use of the compression and/or decompression apparatus to be described below in connection with embodiments.

All of the data compression and/or decompression apparatus is to be described below may be implemented in hardware, in software running on a general-purpose data processing apparatus such as a general-purpose computer, as programmable hardware such as an application specific integrated circuit (ASIC) or field programmable gate array (FPGA) or as combinations of these. In cases where the embodiments are implemented by software and/or firmware, it will be appreciated that such software and/or firmware, and non-transitory machine-readable data storage media by which such software and/or firmware are stored or otherwise provided, are considered as embodiments.

FIG. 1 schematically illustrates an audio/video data transmission and reception system using video data compression and decompression.

An input audio/video signal 10 is supplied to a video data compression apparatus 20 which compresses at least the video component of the audio/video signal 10 for transmission along a transmission route 30 such as a cable, an optical fibre, a wireless link or the like. The compressed signal is processed by a decompression apparatus 40 to provide an output audio/video signal 50. For the return path, a compression apparatus 60 compresses an audio/video signal for transmission along the transmission route 30 to a decompression apparatus 70.

The compression apparatus 20 and decompression apparatus 70 can therefore form one node of a transmission link. The decompression apparatus 40 and decompression apparatus 60 can form another node of the transmission link. Of course, in instances where the transmission link is uni-directional, only one of the nodes would require a compression apparatus and the other node would only require a decompression apparatus.

Figure 2:
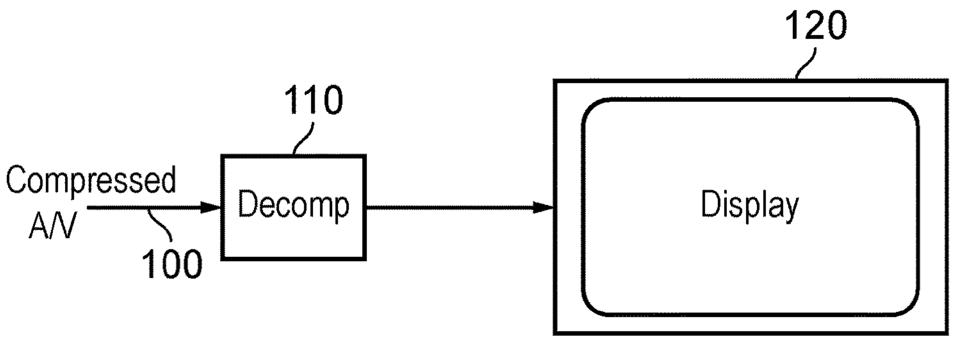
FIG. 2 schematically illustrates a video display system using video data decompression.

FIG. 2 schematically illustrates a video display system using video data decompression. In particular, a compressed audio/video signal 100 is processed by a decompression apparatus 110 to provide a decompressed signal which can be displayed on a display 120. The decompression apparatus 110 could be implemented as an integral part of the display 120, for example being provided within the same casing as the display device. Alternatively, the decompression apparatus 110 might be provided as (for example) a so-called set top box (STB), noting that the expression "set-top" does not imply a requirement for the box to be sited in any particular orientation or position with respect to the display 120; it is simply a term used in the art to indicate a device which is connectable to a display as a peripheral device.

Figure 3:
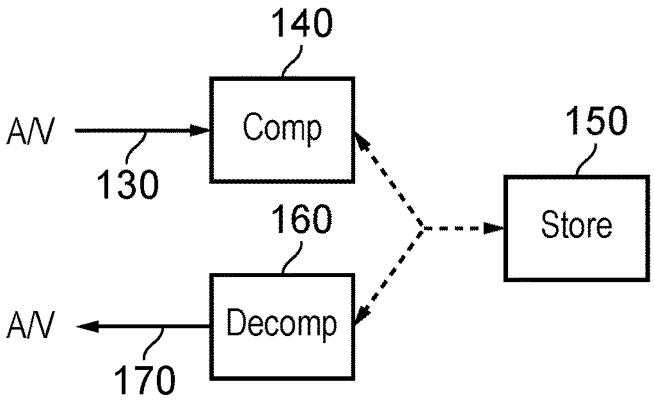
FIG. 3 schematically illustrates an audio/video storage system using video data compression and decompression.

FIG. 3 schematically illustrates an audio/video storage system using video data compression and decompression. An input audio/video signal 130 is supplied to a compression apparatus 140 which generates a compressed signal for storing by a store device 150 such as a magnetic disk device, an optical disk device, a magnetic tape device, a solid state storage device such as a semiconductor memory or other storage device. For replay, compressed data is read from the store device 150 and passed to a decompression apparatus 160 for decompression to provide an output audio/video signal 170.

It will be appreciated that the compressed or encoded signal, and a storage medium or data carrier storing that signal, are considered as embodiments. Reference is made to FIGS. **4*d* and 4*e*** described below.

Figure 4A:
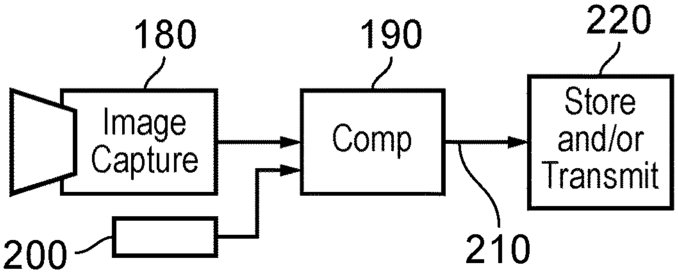
FIG. 4*a* schematically illustrates a video camera using video data compression.

FIG. **4*a* schematically illustrates a video camera using video data compression. In FIG. 4*a*, and image capture device 180, such as a charge coupled device (CCD) image sensor and associated control and read-out electronics, generates a video signal which is passed to a compression apparatus 190. A microphone (or plural microphones) 200 generates an audio signal to be passed to the compression apparatus 190. The compression apparatus 190 generates a compressed audio/video signal 210 to be stored and/or transmitted (shown generically as a schematic stage 220**).

The techniques to be described below relate primarily to video data compression. It will be appreciated that many existing techniques may be used for audio data compression in conjunction with the video data compression techniques which will be described, to generate a compressed audio/video signal. Accordingly, a separate discussion of audio data compression will not be provided. It will also be appreciated that the data rate associated with video data, in particular broadcast quality video data, is generally very much higher than the data rate associated with audio data (whether compressed or uncompressed). It will therefore be appreciated that uncompressed audio data could accompany compressed video data to form a compressed audio/video signal. It will further be appreciated that although the present examples (shown in FIGS. **1-4*e***) relate to audio/video data, the techniques to be described below can find use in a system which simply deals with (that is to say, compresses, decompresses, stores, displays and/or transmits) video data. That is to say, the embodiments can apply to video data compression without necessarily having any associated audio data handling at all.

Figure 4B:
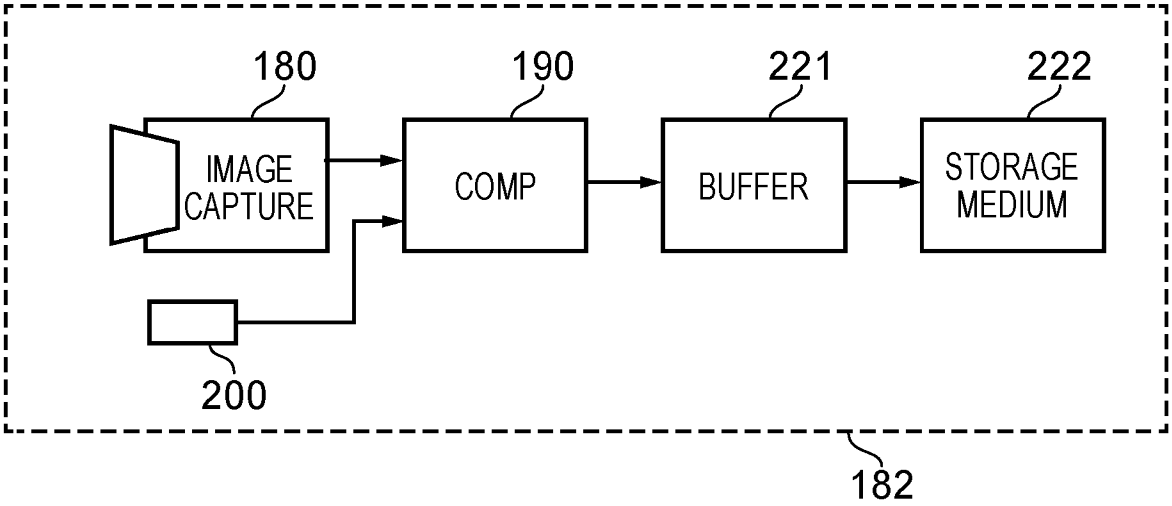
FIG. 4*b* schematically illustrates an example video camera in more detail.
Figure 4C:
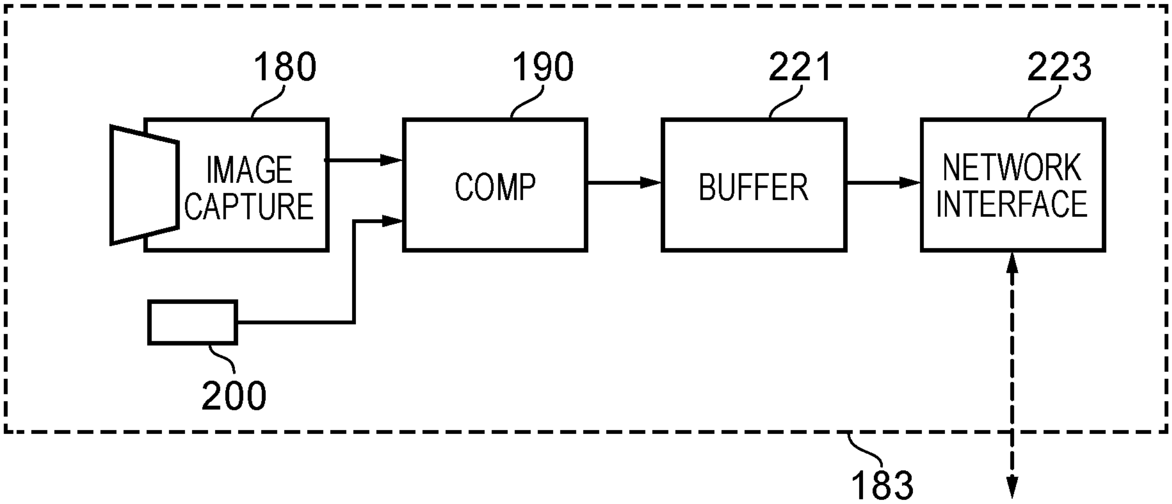
FIG. 4*c* schematically illustrates another example video camera.

FIG. **4*b* schematically illustrates an example video camera apparatus 183 in more detail. Those features numbered in common with FIG. 4*a* will not be described further. FIG. 4*b* is an example of the camera of FIG. 4*a* (in the case that the unit 220 of FIG. 4*a* provides a storage capability) in which the compressed data are first buffered by a buffer 221 and then stored in a storage medium 222 such as a magnetic disk, an optical disk, flash memory, a so-called solid-state disk drive (SSD) or the like. Note that the arrangement of FIG. 4*b* can be implemented as a single (physical) unit 182**.

FIG. **4*c* schematically illustrates another example video camera in which, in place of the storage arrangement of FIG. 4*b*, a network interface 223 is provided in order to allow the compressed data to be transmitted to another unit (not shown). The network interface 223 can also allow for incoming data to be received by the video camera, such as control data. Note that the arrangement of FIG. 4*b* can be implemented as a single (physical) unit 183**.

Figure 4D:
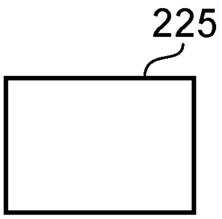
FIGS. 4*d* and 4*e* schematically illustrate date carriers.
Figure 4E:
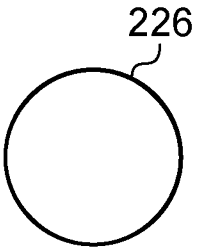

FIGS. **4*d* and 4*e* schematically illustrate date carriers, for example for use as the storage medium 222 and carrying compressed data which has been compressed according to the compression techniques described in the present application. FIG. 4*d* shows a schematic example of a removable non-volatile storage medium 225 implemented as solid state memory such as flash memory. FIG. 4*e* shows a schematic example of a removable non-volatile storage medium 226** implemented as a disk medium such as an optical disk.

Figure 5:
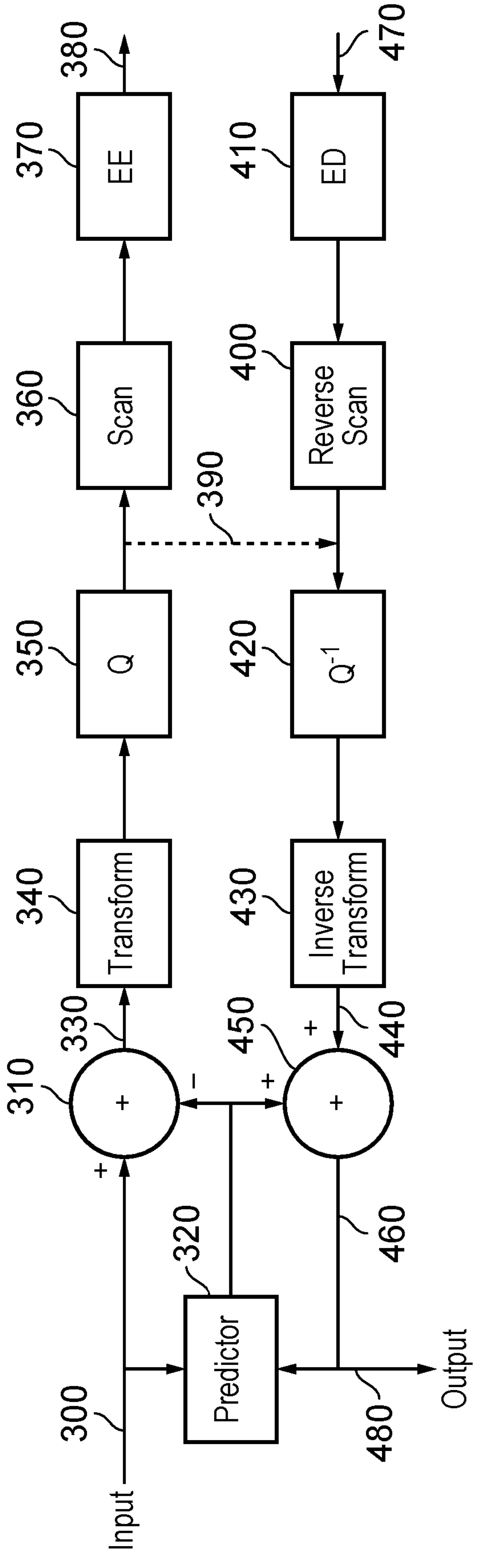
FIG. 5 provides a schematic overview of a video data compression and decompression apparatus.

FIG. 5 provides a schematic overview of a video data compression and decompression apparatus.

Successive images of an input video signal 300 are supplied to an adder 310 and to an image predictor 320. The image predictor 320 will be described below in more detail with reference to FIG. 6. The adder 310 in fact performs a subtraction (negative addition) operation, in that it receives the input video signal 300 on a "+" input and the output of the image predictor 320 on a "-" input, so that the predicted image is subtracted from the input image. The result is to generate a so-called residual image signal 330 representing the difference between the actual and projected images.

One reason why a residual image signal is generated is as follows. The data coding techniques to be described, that is to say the techniques which will be applied to the residual image signal, tends to work more efficiently when there is less "energy" in the image to be encoded. Here, the term "efficiently" refers to the generation of a small amount of encoded data; for a particular image quality level, it is desirable (and considered "efficient") to generate as little data as is practicably possible. The reference to "energy" in the residual image relates to the amount of information contained in the residual image. If the predicted image were to be identical to the real image, the difference between the two (that is to say, the residual image) would contain zero information (zero energy) and would be very easy to encode into a small amount of encoded data. In general, if the prediction process can be made to work reasonably well, the expectation is that the residual image data will contain less information (less energy) than the input image and so will be easier to encode into a small amount of encoded data.

The residual image data 330 is supplied to a transform unit 340 which generates a discrete cosine transform (DCT) representation of the residual image data. The DCT technique itself is well known and will not be described in detail here. There are however aspects of the techniques used in the present apparatus which will be described in more detail below, in particular relating to the selection of different blocks of data to which the DCT operation is applied. These will be discussed with reference to FIGS. 7-12 below.

Note that in some embodiments, a discrete sine transform (DST) is used instead of a DCT. In other embodiments, no transform might be used. This can be done selectively, so that the transform stage is, in effect, bypassed, for example under the control of a "transform skip" command or mode.

The output of the transform unit 340, which is to say, a set of transform coefficients for each transformed block of image data, is supplied to a quantiser 350. Various quantisation techniques are known in the field of video data compression, ranging from a simple multiplication by a quantisation scaling factor through to the application of complicated lookup tables under the control of a quantisation parameter. The general aim is twofold. Firstly, the quantisation process reduces the number of possible values of the transformed data. Secondly, the quantisation process can increase the likelihood that values of the transformed data are zero. Both of these can make the entropy encoding process work more efficiently in generating small amounts of compressed video data.

A data scanning process is applied by a scan unit 360. The purpose of the scanning process is to reorder the quantised transformed data so as to gather as many as possible of the non-zero quantised transformed coefficients together, and of course therefore to gather as many as possible of the zero-valued coefficients together. These features can allow so-called run-length coding or similar techniques to be applied efficiently. So, the scanning process involves selecting coefficients from the quantised transformed data, and in particular from a block of coefficients corresponding to a block of image data which has been transformed and quantised, according to a "scanning order" so that (a) all of the coefficients are selected once as part of the scan, and (b) the scan tends to provide the desired reordering. One example scanning order which can tend to give useful results is a so-called zigzag scanning order.

The scanned coefficients are then passed to an entropy encoder (EE) 370. Again, various types of entropy encoding may be used. Two examples are variants of the so-called CABAC (Context Adaptive Binary Arithmetic Coding) system and variants of the so-called CAVLC (Context Adaptive Variable-Length Coding) system. In general terms, CABAC is considered to provide a better efficiency, and in some studies has been shown to provide a 10-20% reduction in the quantity of encoded output data for a comparable image quality compared to CAVLC. However, CAVLC is considered to represent a much lower level of complexity (in terms of its implementation) than CABAC. Note that the scanning process and the entropy encoding process are shown as separate processes, but in fact can be combined or treated together. That is to say, the reading of data into the entropy encoder can take place in the scan order. Corresponding considerations apply to the respective inverse processes.

The output of the entropy encoder 370, along with additional data, for example defining the manner in which the predictor 320 generated the predicted image, provides a compressed output video signal 380.

However, a return path is also provided because the operation of the predictor 320 itself depends upon a decompressed version of the compressed output data.

The reason for this feature is as follows. At the appropriate stage in the decompression process a decompressed version of the residual data is generated. This decompressed residual data has to be added to a predicted image to generate an output image (because the original residual data was the difference between the input image and a predicted image). In order that this process is comparable, as between the compression side and the decompression side, the predicted images generated by the predictor 320 should be the same during the compression process and during the decompression process. Of course, at decompression, the apparatus does not have access to the original input images, but only to the decompressed images. Therefore, at compression, the predictor 320 bases its prediction (at least, for inter-image encoding) on decompressed versions of the compressed images.

The entropy encoding process carried out by the entropy encoder 370 is considered to be "lossless", which is to say that it can be reversed to arrive at exactly the same data which was first supplied to the entropy encoder 370. So, the return path can be implemented before the entropy encoding stage. Indeed, the scanning process carried out by the scan unit 360 is also considered lossless, but in the present embodiment the return path 390 is from the output of the quantiser 350 to the input of a complimentary inverse quantiser 420.

In general terms, an entropy decoder 410, the reverse scan unit 400, an inverse quantiser 420 and an inverse transform unit 430 provide the respective inverse functions of the entropy encoder 370, the scan unit 360, the quantiser 350 and the transform unit 340. For now, the discussion will continue through the compression process; the process to decompress an input compressed video signal corresponds to the return path of the compression process.

In the compression process, the scanned coefficients are passed by the return path 390 from the quantiser 350 to the inverse quantiser 420 which carries out the inverse operation of the scan unit 360. An inverse quantisation and inverse transformation process are carried out by the units 420, 430 to generate a compressed-decompressed residual image signal 440.

The image signal 440 is added, at an adder 450, to the output of the predictor 320 to generate a reconstructed output image 460. This forms one input to the image predictor 320.

Turning now to the process applied to a received compressed video signal 470, the signal is supplied to the entropy decoder 410 and from there to the chain of the reverse scan unit 400, the inverse quantiser 420 and the inverse transform unit 430 before being added to the output of the image predictor 320 by the adder 450. In straightforward terms, the output 460 of the adder 450 forms the output decompressed video signal 480. In practice, further filtering may be applied before the signal is output.

Figure 6:
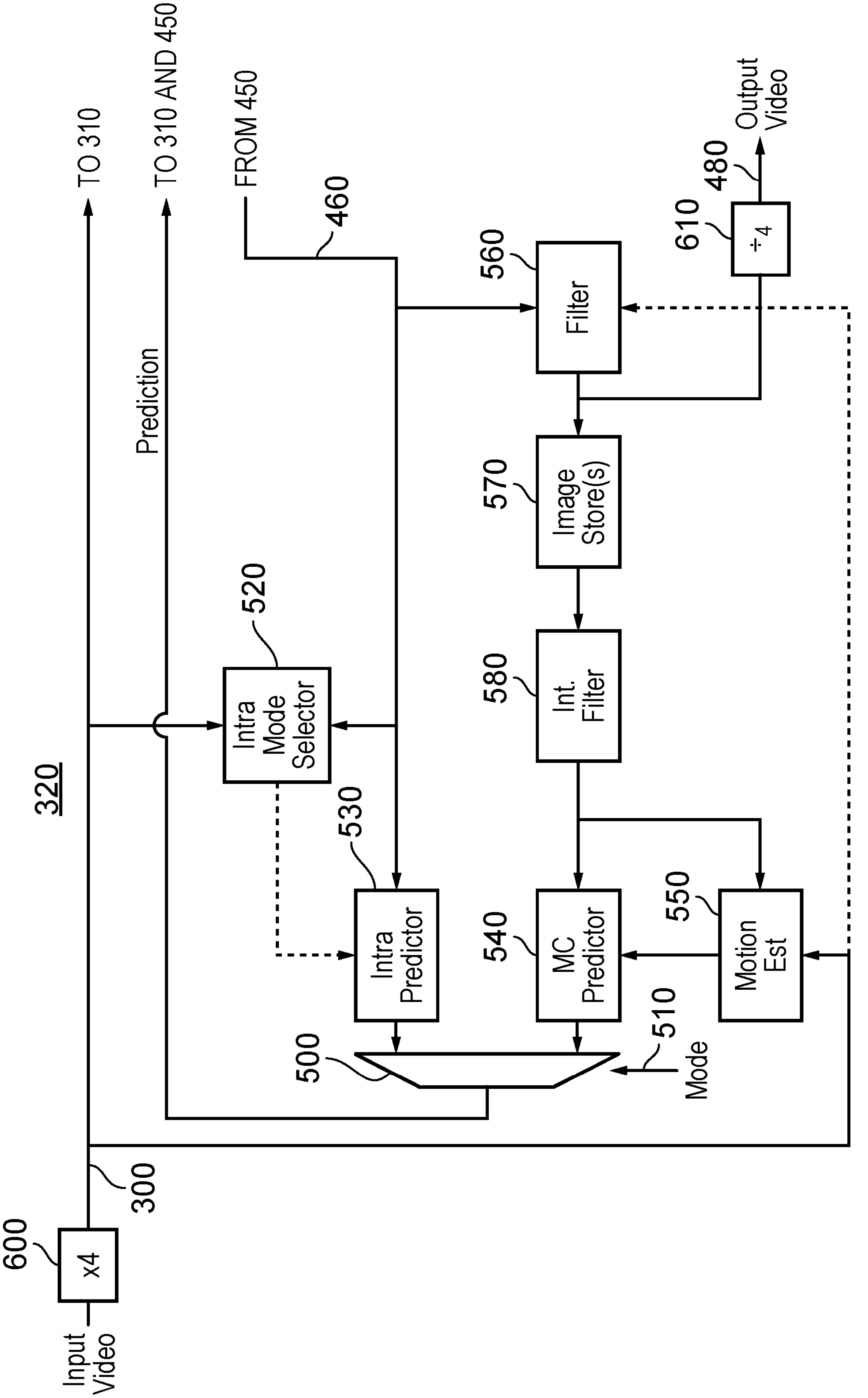
FIG. 6 schematically illustrates the generation of predicted images.
Figure 7:
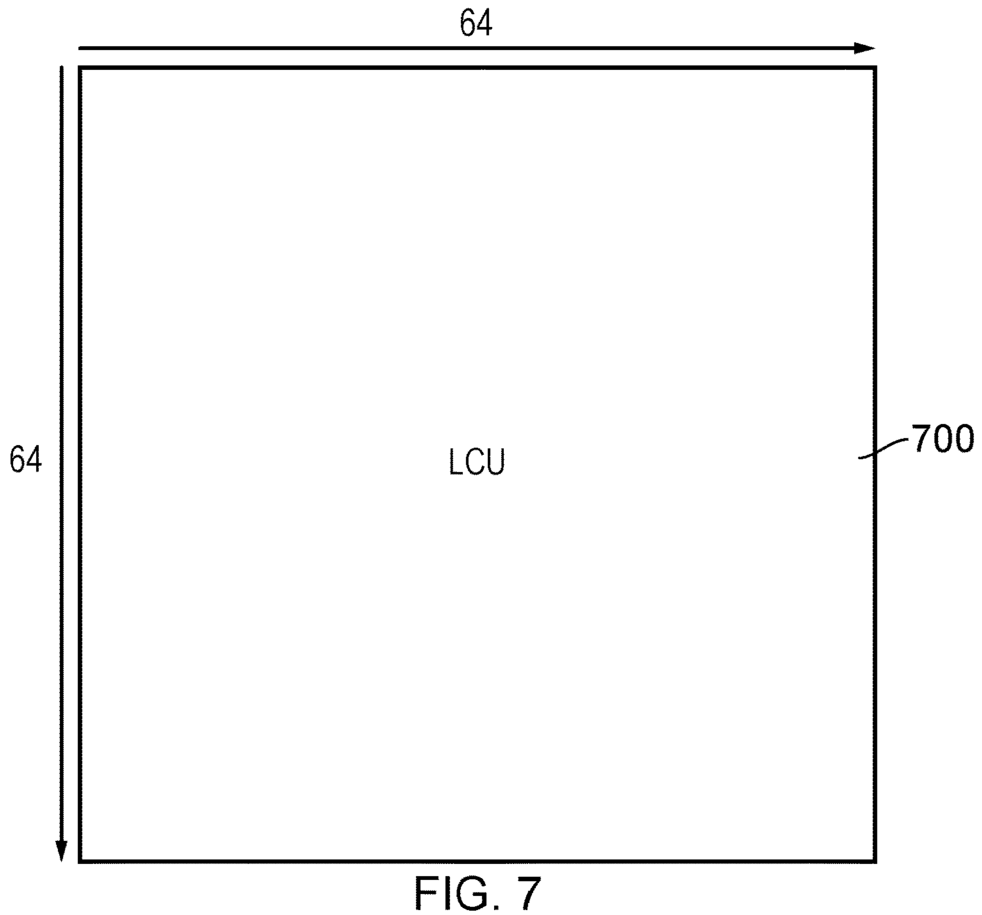
FIG. 7 schematically illustrates a largest coding unit (LCU)

FIG. 6 schematically illustrates the generation of predicted images, and in particular the operation of the image predictor 320.

There are two basic modes of prediction: so-called intra-image prediction and so-called inter-image, or motion-compensated (MC), prediction.

Intra-image prediction bases a prediction of the content of a block of the image on data from within the same image. This corresponds to so-called I-frame encoding in other video compression techniques. In contrast to I-frame encoding, where the whole image is intra-encoded, in the present embodiments the choice between intra- and inter-encoding can be made on a block-by-block basis, though in other embodiments the choice is still made on an image-by-image basis.

Motion-compensated prediction makes use of motion information which attempts to define the source, in another adjacent or nearby image, of image detail to be encoded in the current image. Accordingly, in an ideal example, the contents of a block of image data in the predicted image can be encoded very simply as a reference (a motion vector) pointing to a corresponding block at the same or a slightly different position in an adjacent image.

Returning to FIG. 6, two image prediction arrangements (corresponding to intra- and inter-image prediction) are shown, the results of which are selected by a multiplexer 500 under the control of a mode signal 510 so as to provide blocks of the predicted image for supply to the adders 310 and 450. The choice is made in dependence upon which selection gives the lowest "energy" (which, as discussed above, may be considered as information content requiring encoding), and the choice is signalled to the encoder within the encoded output datastream. Image energy, in this context, can be detected, for example, by carrying out a trial subtraction of an area of the two versions of the predicted image from the input image, squaring each pixel value of the difference image, summing the squared values, and identifying which of the two versions gives rise to the lower mean squared value of the difference image relating to that image area.

The actual prediction, in the intra-encoding system, is made on the basis of image blocks received as part of the signal 460, which is to say, the prediction is based upon encoded-decoded image blocks in order that exactly the same prediction can be made at a decompression apparatus. However, data can be derived from the input video signal 300 by an intra-mode selector 520 to control the operation of the intra-image predictor 530.

For inter-image prediction, a motion compensated (MC) predictor 540 uses motion information such as motion vectors derived by a motion estimator 550 from the input video signal 300. Those motion vectors are applied to a processed version of the reconstructed image 460 by the motion compensated predictor 540 to generate blocks of the inter-image prediction.

The processing applied to the signal 460 will now be described. Firstly, the signal is filtered by a filter unit 560. This involves applying a "deblocking" filter to remove or at least tend to reduce the effects of the block-based processing carried out by the transform unit 340 and subsequent operations. Also, an adaptive loop filter is applied using coefficients derived by processing the reconstructed signal 460 and the input video signal 300. The adaptive loop filter is a type of filter which, using known techniques, applies adaptive filter coefficients to the data to be filtered. That is to say, the filter coefficients can vary in dependence upon various factors. Data defining which filter coefficients to use is included as part of the encoded output datastream.

The filtered output from the filter unit 560 in fact forms the output video signal 480. It is also buffered in one or more image stores 570; the storage of successive images is a requirement of motion compensated prediction processing, and in particular the generation of motion vectors. To save on storage requirements, the stored images in the image stores 570 may be held in a compressed form and then decompressed for use in generating motion vectors. For this particular purpose, any known compression/decompression system may be used. The stored images are passed to an interpolation filter 580 which generates a higher resolution version of the stored images; in this example, intermediate samples (sub-samples) are generated such that the resolution of the interpolated image is output by the interpolation filter 580 is 8 times (in each dimension) that of the images stored in the image stores 570. The interpolated images are passed as an input to the motion estimator 550 and also to the motion compensated predictor 540.

In embodiments, a further optional stage is provided, which is to multiply the data values of the input video signal by a factor of four using a multiplier 600 (effectively just shifting the data values left by two bits), and to apply a corresponding divide operation (shift right by two bits) at the output of the apparatus using a divider or right-shifter 610. So, the shifting left and shifting right changes the data purely for the internal operation of the apparatus. This measure can provide for higher calculation accuracy within the apparatus, as the effect of any data rounding errors is reduced.

The way in which an image is partitioned for compression processing will now be described. At a basic level, and image to be compressed is considered as an array of blocks of samples. For the purposes of the present discussion, the largest such block under consideration is a so-called largest coding unit (LCU) 700 (FIG. 7), which represents a square array of 64×64 samples. Here, the discussion relates to luminance samples. Depending on the chrominance mode, such as 4:4:4, 4:2:2, 4:2:0 or 4:4:4:4 (GBR plus key data), there will be differing numbers of corresponding chrominance samples corresponding to the luminance block.

Three basic types of blocks will be described: coding units, prediction units and transform units. In general terms, the recursive subdividing of the LCUs allows an input picture to be partitioned in such a way that both the block sizes and the block coding parameters (such as prediction or residual coding modes) can be set according to the specific characteristics of the image to be encoded.

Figure 8:
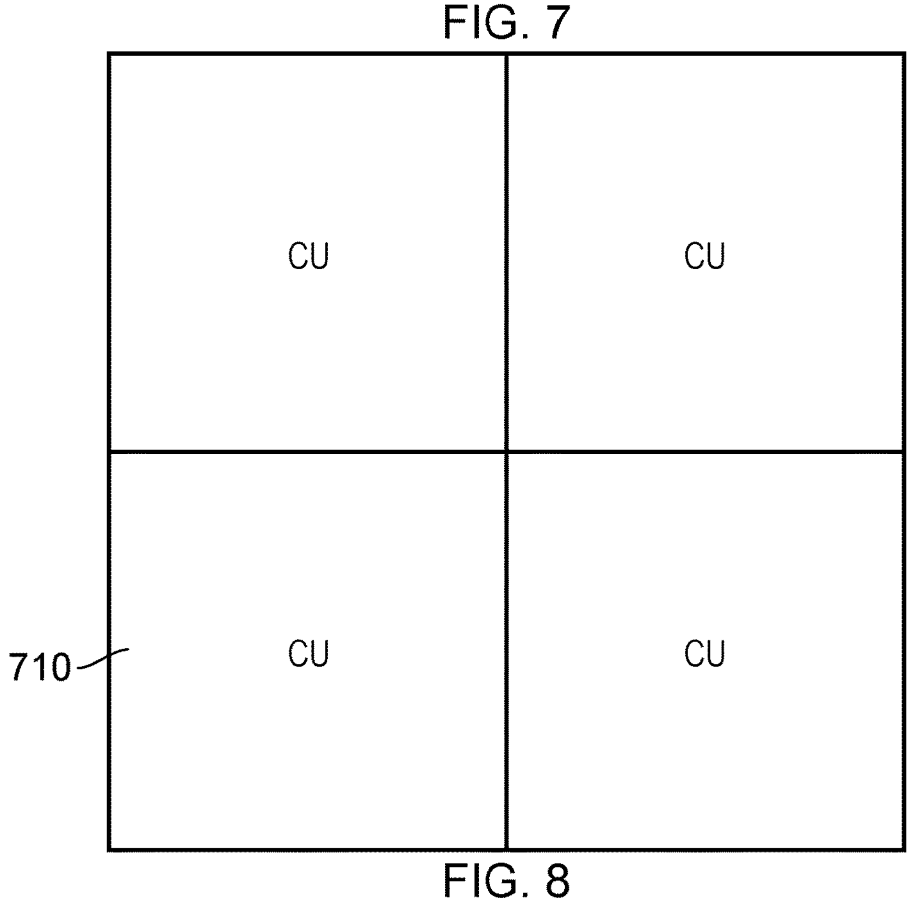
FIG. 8 schematically illustrates a set of four coding units (CU)
Figure 9:
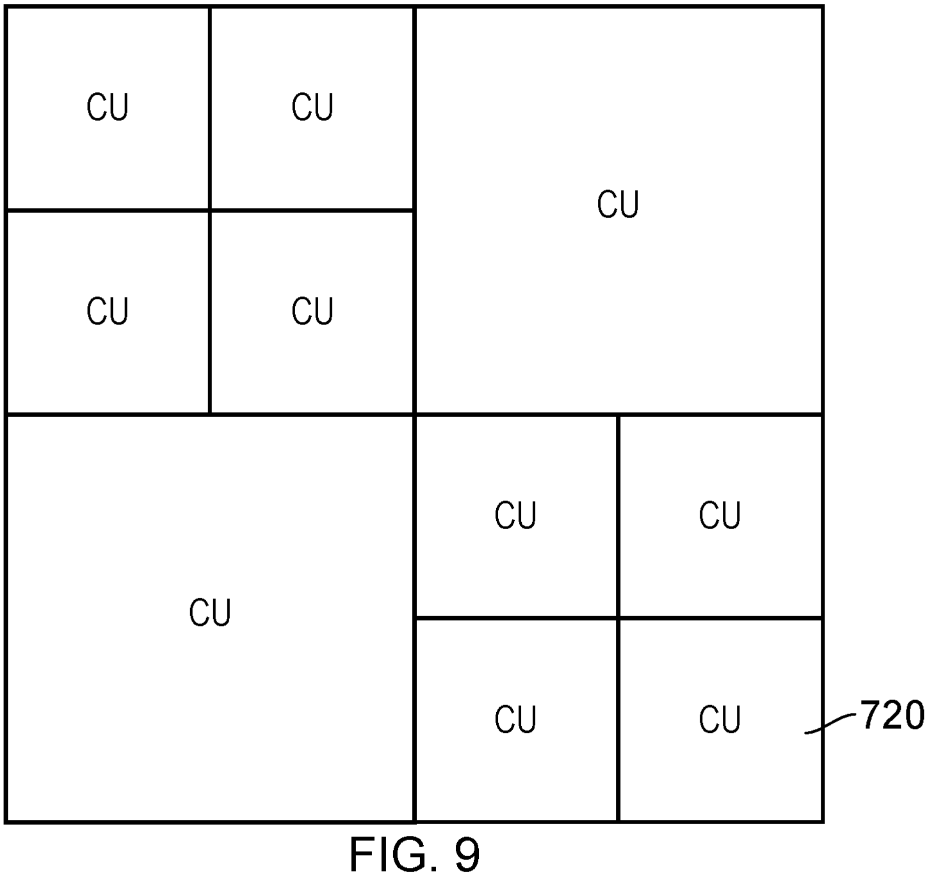
FIGS. 9 and 10 schematically illustrate the coding units of FIG. 8 sub-divided into smaller coding units.
Figure 10:
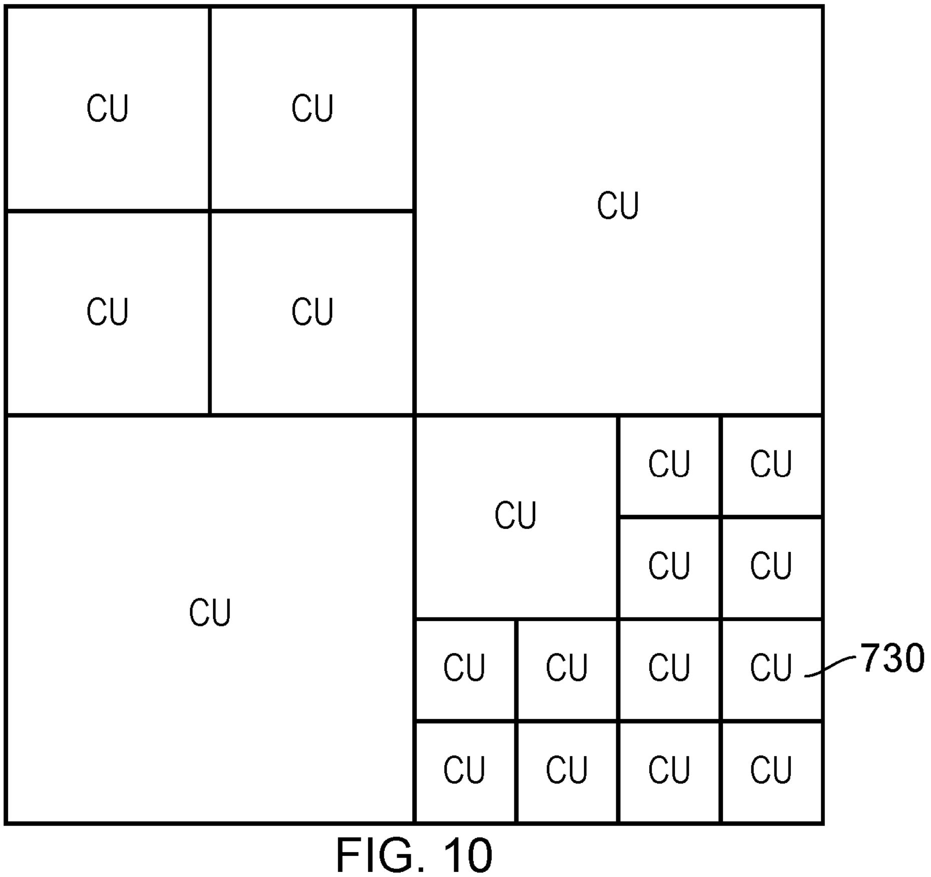

The LCU may be subdivided into so-called coding units (CU). Coding units are always square and have a size between 8×8 samples and the full size of the LCU 700. The coding units can be arranged as a kind of tree structure, so that a first subdivision may take place as shown in FIG. 8, giving coding units 710 of 32×32 samples; subsequent subdivisions may then take place on a selective basis so as to give some coding units 720 of 16×16 samples (FIG. 9) and potentially some coding units 730 of 8×8 samples (FIG. 10). Overall, this process can provide a content-adapting coding tree structure of CU blocks, each of which may be as large as the LCU or as small as 8×8 samples. Encoding of the output video data takes place on the basis of the coding unit structure.

Figure 11:
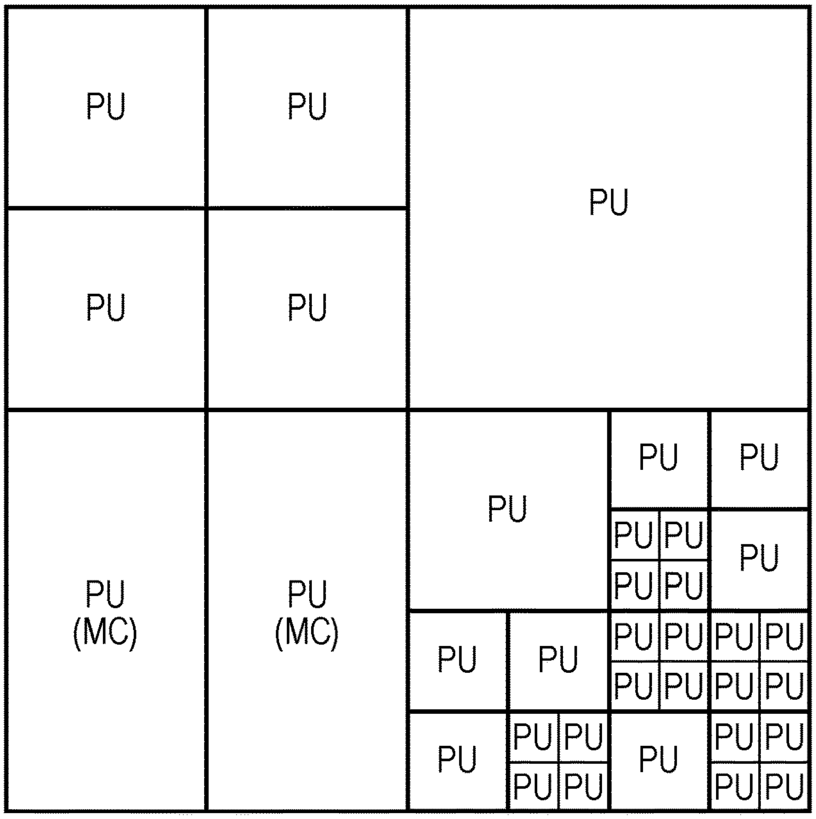
FIG. 11 schematically illustrates an array of prediction units (PU)

FIG. 11 schematically illustrates an array of prediction units (PU). A prediction unit is a basic unit for carrying information relating to the image prediction processes, or in other words the additional data added to the entropy encoded residual image data to form the output video signal from the apparatus of FIG. 5. In general, prediction units are not restricted to being square in shape. They can take other shapes, in particular rectangular shapes forming half of one of the square coding units, as long as the coding unit is greater than the minimum (8×8) size. The aim is to allow the boundary of adjacent prediction units to match (as closely as possible) the boundary of real objects in the picture, so that different prediction parameters can be applied to different real objects. Each coding unit may contain one or more prediction units.

Figure 12:
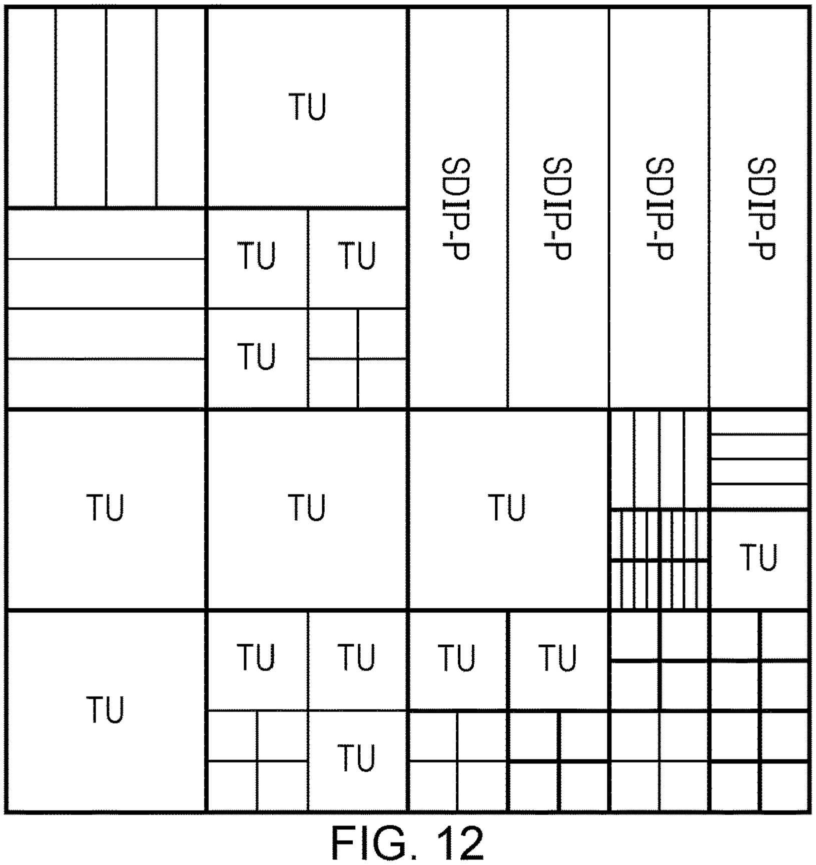
FIG. 12 schematically illustrates an array of transform units (TU)

FIG. 12 schematically illustrates an array of transform units (TU). A transform unit is a basic unit of the transform and quantisation process. Transform units are always square and can take a size from 4×4 up to 32×32 samples. Each coding unit can contain one or more transform units. The acronym SDIP-P in FIG. 12 signifies a so-called short distance intra-prediction partition. In this arrangement only one dimensional transforms are used, so a 4×N block is passed through N transforms with input data to the transforms being based upon the previously decoded neighbouring blocks and the previously decoded neighbouring lines within the current SDIP-P.

Transform Matrices

The following discussion relates to aspects of the transform unit 340 and the inverse transform unit 430. Note that as mentioned above, the transform unit is present in encoders. The inverse transform unit is present in the return decoding path of an encoder and in the decoding path of a decoder.

The transform unit and the inverse transform unit are intended to provide complementary transformations to and from the spatial frequency domain. That is to say, the transform unit 340 acts on sets of video data (or data derived from video data, such as the difference or residual data discussed above) and generates corresponding sets of spatial frequency coefficients. The inverse transform unit 430 acts on sets of spatial frequency coefficients and generates corresponding sets of video data.

In practice the transformations are implemented as matrix calculations. The forward transform is defined by a transformation matrix and the transformation is implemented by matrix-multiplying the transformation matrix by an array of sample values to generate a corresponding array of spatial frequency coefficients. In some examples, the array of samples, M, is left-multiplied by the transformation matrix T, and then the result is right-multiplied by the transpose of the transformation matrix, $T^T$. So the array of output coefficients is defined as $$T \cdot M \cdot T^T$$

A property of the type of matrix which represents a spatial frequency transformation of this type is that the transpose of the matrix is the same as its inverse. So, in principle the forward and inverse transformation matrices are related by a simple transposition.

In the proposed HEVC Standard, as it exists at the date of filing of the present application, the transformations are defined only as inverse transformation matrices used in the decoder function. The encoder transformation matrices are not defined as such. The decoder (inverse) transformations are defined to a six bit precision.

As mentioned above, in principle a suitable set of forward (encoder) matrices could be obtained as the transposition of the inverse matrices. However, the relationship between the forward and inverse matrices applies only if the values are expressed to infinite precision. Expressing the values to a limited precision, such as six bits, means that the transposition is not necessarily an appropriate relationship between the forward and inverse matrices.

It is recognized that fabricating or implementing integer-arithmetic transform and inverse transform units can be easier, cheaper, faster and/or less processor-intensive than implementing similar units using floating point calculations. Accordingly, the matrix coefficients to be discussed below are expressed as integers, scaled up from the actual values required to implement the transform by a number of bits (powers of 2) sufficient to allow for the required coefficient precision. If required, the scaling-up can be removed by a bit shift (division by a number of powers of 2) at another stage in the process. In other words, the actual transformation coefficients are proportional to the values to be discussed below.

6-Bit Inverse Transform Matrices

This section details the current HEVC Standard's inverse transform-matrices which would be present in all decoders.

4×4 DST

The transform matrix is of the form shown in FIG. 13, where each of the letters indicates a respective coefficient value, and where the values in the grid are defined according to the table of FIG. 14.

Combined DCT Matrix

For ease of implementation, a single 32×32 DCT matrix $M_{32}$ can be described, from which each smaller N×N DCT matrix $M_N$ is derived through subsampling according to the following:

$$M_N[x][y]=M_{32}[x][(2^{(5-\log 2(N))})y] \text{ for } x, y=0 \ldots (N-1).$$

For example, N may be a power of two smaller than 32 such as 4, 8, or 16, depending on the size of the array of data to be transformed.

The combined matrix $M_{32}$ is of the form shown in FIG. 15, where once again the different letters refer to respective coefficient values. Note that the upper case versions and lower case versions of the same letter represent different coefficients—so "A" does not refer to the same value as "a".

The values in the grid are defined according to the table shown in FIG. 16.

Increased-Precision Forward Transform Matrices

This section, read in conjunction with the discussion above, discusses video data encoding methods and apparatus for encoding an array of video data values using forward transform matrices at various levels of precision.

The basis of this discussion is that improved results can be obtained by using forward matrices, matched to the standard inverse matrices, which have coefficients expressed to a higher resolution than six bits. This is particularly the case where the system is encoding high bit depth video data (that is, video data having a large "bit depth" or data precision expressed as a number of bits, for example 16 bit video data). Here, it can be useful to select a data precision of the transform matrices according to the bit depth of the video data values.

The matrix values to be discussed below are applicable, for example, to frequency-transforming the video data values according to a frequency transform, to generate an array of frequency-transformed values by a matrix-multiplication process using a transform matrix having a data precision greater than six bits, the transform matrix having coefficients defined by at least a subset of the values discussed below, and to a frequency transform unit such as the unit 340) which performs such operations.

In some embodiments, it can be useful to process video data having a bit depth of N bits using, for example, matrix coefficients having a bit depth or precision of N−2 or N−3 bits.

Here, the term "matched" implies that the forward matrix, when used to complement the standard inverse matrix, will give a lower error than other forward matrices expressed to that precision. In some instances, the error may be minimised; in others, it may at least be alleviated. The term "error" relates (in the context of a chain of forward and inverse transformations) to differences between data supplied as an input to the forward transformation and corresponding data generated as an output of the inverse transformation.

4×4 DST

The transform matrix is again of the form shown in FIG. 13, where the values in the grid are defined by the matrix precision according to the tables of FIGS. 17*a* to 17*c*. Note that although the values shown are indicative of embodiments of the present technology (which is to say, values equal to those numbers may be used), each of these numbers may be varied by (for example) +/−2. Here, each row relates to a different one of the letters defining the coefficients.

Each column relates to a different precision or bit depth of the matrix coefficients.

Combined DCT Matrix

Again, for ease of implementation, a single 32×32 DCT matrix $M_{32}$ can be described, from which each smaller N×N DCT matrix $M_N$ is derived through subsampling according to the following:

$$M_N[x][y]=M_{32}[x][(2^{(5-\log 2(N))})y] \text{ for } x,y=0\ldots(N-1).$$

Figure 15:
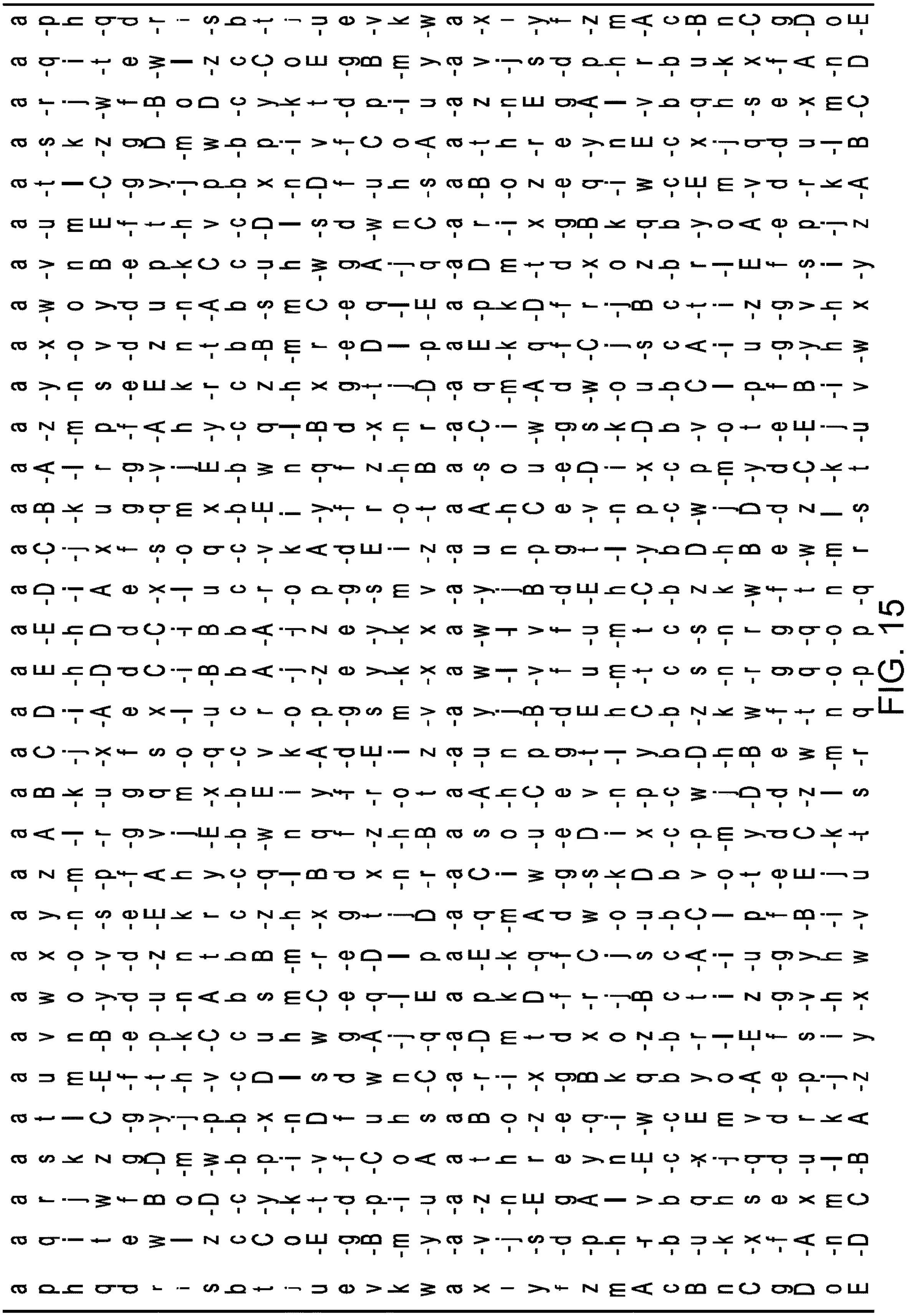
FIG. 15 schematically illustrates a 32×32 combined DCT transform matrix.

The combined matrix $M_{32}$ is again of the form shown schematically in FIG. 15, but this time with the values in the grid defined by the matrix precision according to the tables of FIGS. 18*a* to 18*c*. Note that although the values shown are indicative of embodiments of the present technology, each of these numbers may be varied by +/−2. Accordingly, actual values which are substantially equal to the values in the table may be used, where the term "substantially equal" means "the table value+/−2".

For completeness, the smaller DCT matrices derived from the 32×32 matrix are presented here. The values in each grid are defined by the matrix coefficient precision according to the above table.

4×4 DCT

The matrix $M_4$ is defined according to the equation set out above as the first 4 coefficients of every $8^{th}$ row of the combined matrix $M_{32}$. These coefficients are shown in FIG. 19.

8×8 DCT

The matrix $M_8$ is defined according to the equation set out above as the first 8 coefficients of every $4^{th}$ row of the combined matrix $M_{32}$. These coefficients are shown in FIG. 20.

16×16 DCT

The matrix $M_{16}$ is defined according to the equation set out above as the first 16 coefficients of every even row of the combined matrix $M_{32}$. These coefficients are shown in FIG. 21.

Accordingly, coefficient values are selected according to the data precision from the values listed in the relevant tables shown in the accompanying drawings.

Example Results

Standard HEVC v1 implementations are likely to use the forward transform according to the same matrices as the inverse transform. However, as input bit depth increases, it can become appropriate to match the forward transform to the inverse transform, as otherwise errors are introduced between applying the forward transform and its inverse for the reasons discussed above. In addition, it also becomes appropriate to increase the effective fixed-bit depth of the transform matrices, again because otherwise the errors will start to become significant. In embodiments of the present technology, an encoder that codes up to N-bit input data (with a high SNR) may use a forward transform bit depth of at least N−3 bits, for example N−2 bits (so as to provide an offset of 2 or 3 less than the bit depth of the video data values, for example). Depending on the implementation, such an encoder may or may not use less accurate forward transform bit depths for lower input bit-depth systems (for example, it may be able to reduce the power, or utilise a faster software implementation).

Accordingly, in embodiments, the forward transform unit 340 may be operable to stored data relating to the tables of (for example) FIGS. 18*a*-18*c*, and to select data from an appropriate column of these tables according to the internal video bit depth in use.

Figure 22:
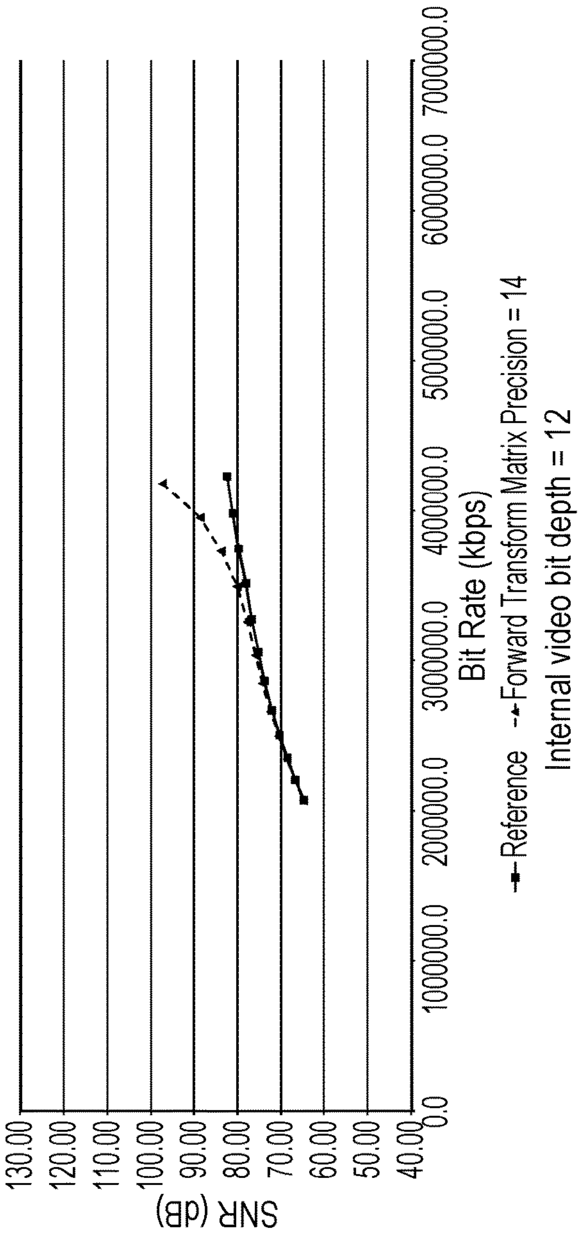
FIGS. 22 to 26 schematically illustrate empirical results obtained using techniques according to embodiments of the present technology.
Figure 23:
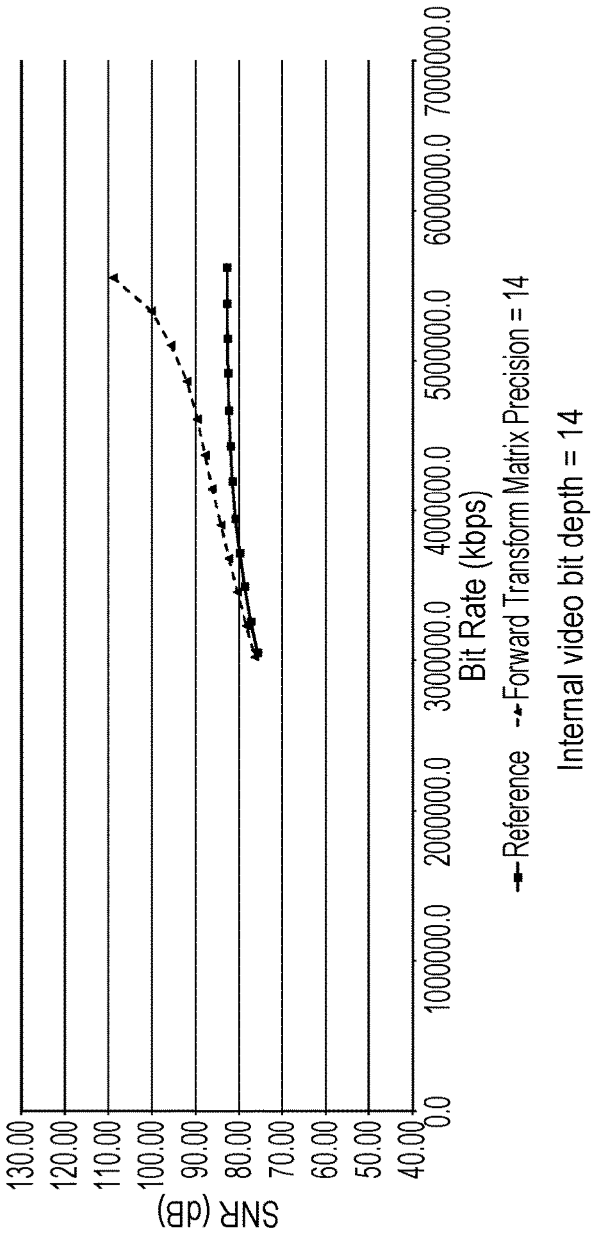
Figure 24:
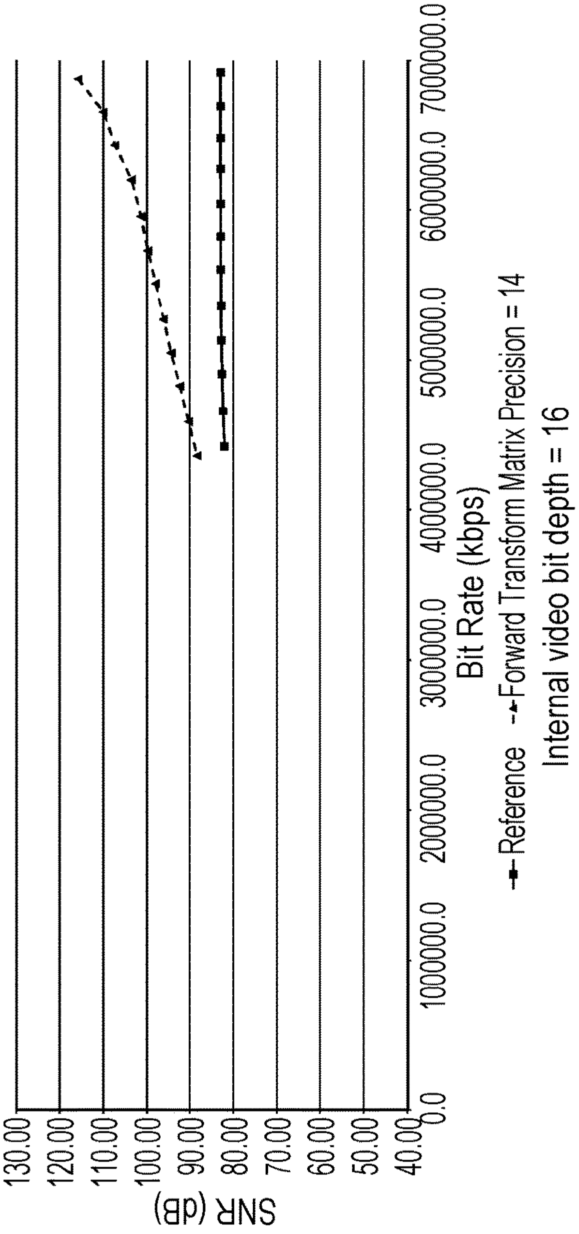

The graphs described below illustrate (a) a reference performance using the standard 6-bit inverse transform as its own forward transform (the current standard HEVC C model method at the time of filing), along with results obtained by using a higher precision forward transform matched to the 6-bit inverse transform. The results are provided at different respective bit depths of the video data being processed, and indicate the system performance as a measure of signal to noise ratio (SNR) in decibels (dB) against bit rate in kilo-bits per second (kbps). The SNR measure is obtained from the encoding and then decoding of a test sequence of video, according to the bit rate and bit depth specified, and is derived from errors as averaged over the test sequence. The reference results are shown in a solid line and the test results of the increased precision matrices are shown in a broken line. FIGS. 22 to 24 illustrate results obtained for a matrix precision of 14 (that is to say, using data in the columns headed "14 bits" in FIG. 18*a*), for an internal (within the processing operation) video bit depth of 12 (FIG. 22), 14 (FIG. 24) and 16 (FIG. 26).

Figure 25:
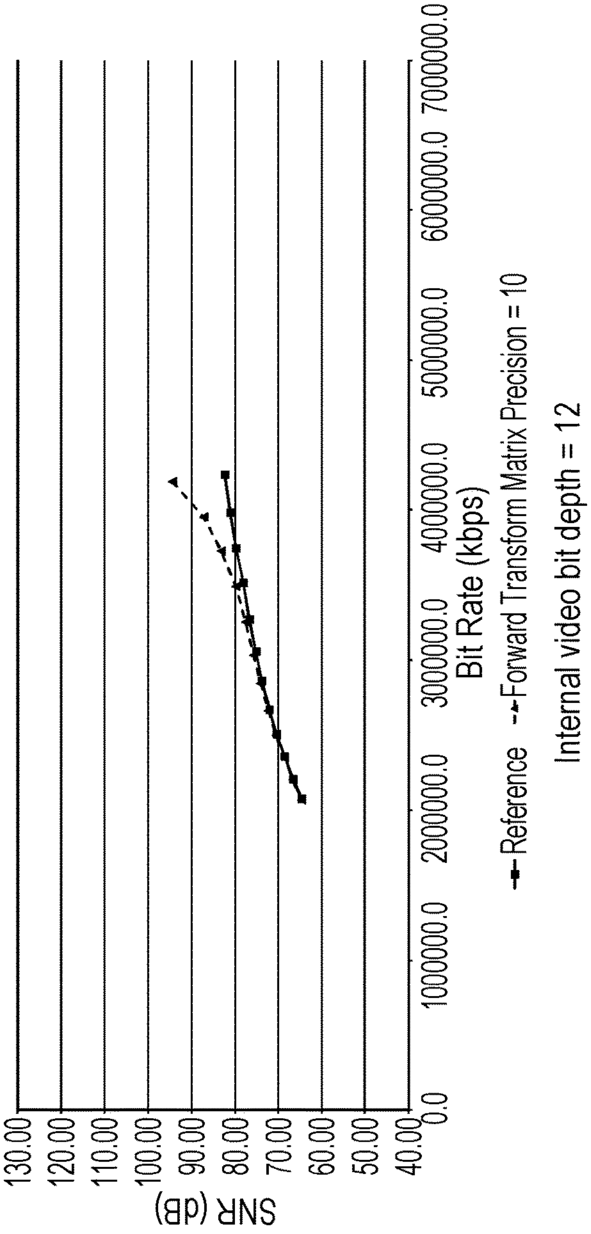
Figure 26:
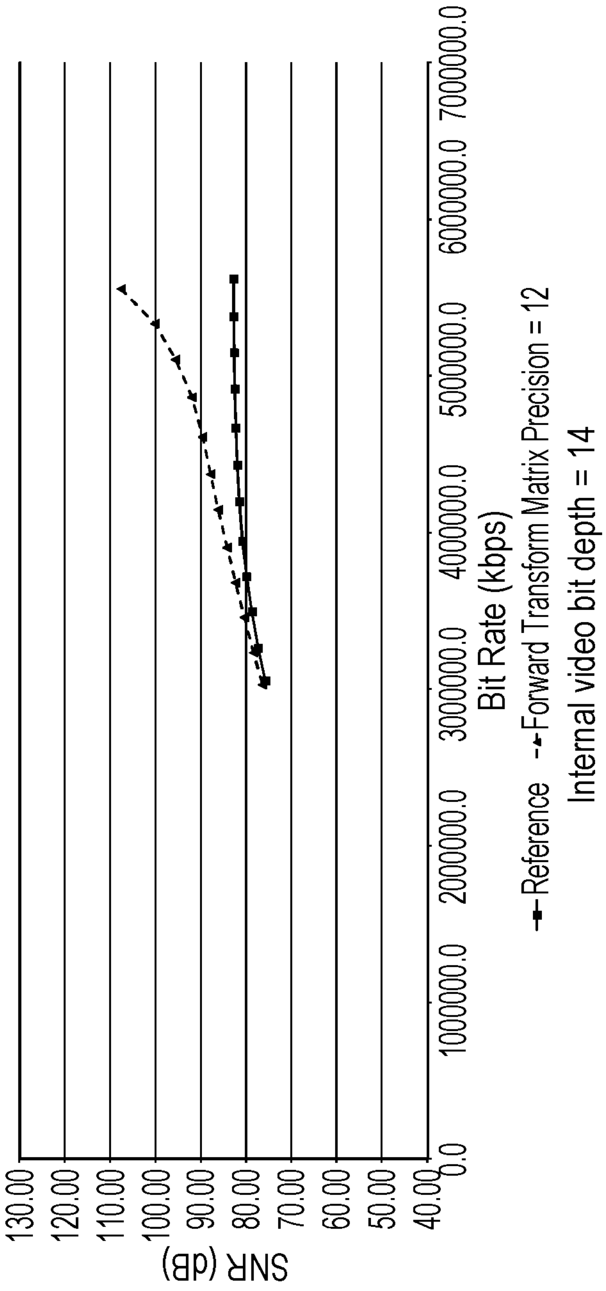

FIGS. 25 and 26 illustrate results obtained for a matrix precision of <internal video bit-depth>−2, for an internal video bit depth of 12 (FIG. 25) and 14 (FIG. 26).

In each of FIGS. 22 to 26 it can be seen that the SNR for each of the test results is better, over at least some of the range of bit rates tested, than that of the reference system at that video bit depth.

Image data encoded or decoded using these techniques and a data carrier which carries such image data are considered to represent an embodiment of the present disclosure.

Respective aspects and features of at least some embodiments are defined by the following numbered clauses:

1. A video data encoding method for encoding an array of video data values, the method comprising the steps of:

frequency-transforming the video data values according to a frequency transform, to generate an array of frequency-transformed values by a matrix-multiplication process using a transform matrix having a data precision greater than six bits, the transform matrix having coefficients defined by at least a subset of the following values:

(a) for the case that the frequency transform is a discrete cosine transform:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| a | a | a | a | a | a | a | a | a | a | a | a | a | a | a | a | a | a | a | a | a | a | a | a | a | a | a | a | a | a | a | a |
| p | q | r | s | t | u | v | w | x | y | z | A | B | C | D | E | -E | -D | -C | -B | -A | -z | -y | -x | -w | -v | -u | -t | -s | -r | -q | -p |
| h | i | j | k | l | m | n | o | -o | -n | -m | -l | -k | -j | -i | -h | -h | -i | -j | -k | -l | -m | -n | -o | o | n | m | l | k | j | l | h |
| q | t | w | z | C | -E | -B | -y | -v | -s | -p | -r | -u | -x | -A | -D | D | A | x | u | r | p | s | v | y | B | E | -C | -z | -w | -t | -q |
| d | e | f | g | -g | -f | -e | -d | -d | -e | -f | -g | g | f | e | d | d | e | f | g | -g | -f | -e | -d | -d | -e | -f | -g | g | f | e | d |
| r | w | B | -D | -y | -t | -p | -u | -z | -E | A | v | q | s | x | C | -C | -x | -s | -q | -v | -A | E | z | u | p | t | y | D | -B | -w | -r |
| i | l | o | -m | -j | -h | -k | -n | n | k | h | j | m | -o | -l | -i | -i | -l | -o | m | j | h | k | n | -n | -k | -h | -j | -m | o | l | i |
| s | z | -D | -w | -p | -v | -C | A | t | r | y | -E | -x | -q | -u | -B | B | u | q | x | E | -y | -r | -t | -A | C | v | p | w | D | -z | -s |
| b | c | -c | -b | -b | -c | c | b | b | c | -c | -b | -b | -c | c | b | b | c | -c | -b | -b | -c | c | b | b | c | -c | -b | -b | -c | c | b |
| t | C | -y | -p | -x | D | u | s | B | -z | -q | -w | E | v | r | A | -A | -r | -v | -E | w | q | z | -B | -s | -u | -D | x | p | y | -C | -t |
| j | o | -k | -i | -n | l | h | m | -m | -h | -l | n | i | k | -o | -j | -j | -o | k | i | n | -l | -h | -m | m | h | l | -n | -i | -k | o | j |
| u | -E | -t | -v | D | s | w | -C | -r | -x | B | q | y | -A | -p | -z | z | p | A | -y | -q | -B | x | r | C | -w | -s | -D | v | t | E | -u |
| e | -g | -d | -f | f | d | g | -e | -e | g | d | f | -f | -d | -g | e | e | -g | -d | -f | f | d | g | -e | -e | g | d | f | -f | -d | -g | e |
| v | -B | -p | -C | u | w | -A | -q | -D | t | x | -z | -r | -E | s | y | -y | -s | E | r | z | -x | -t | D | q | A | -w | -u | C | p | B | -v |
| k | -m | -i | o | h | n | -j | -l | l | j | -n | -h | -o | i | m | -k | -k | m | i | -o | -h | -n | j | l | -l | -j | n | h | o | -i | -m | k |
| w | -y | -u | A | s | -C | -q | E | p | D | -r | -B | t | z | -v | -x | x | v | -z | -t | B | r | -D | -p | -E | q | C | -s | -A | u | y | -w |
| a | -a | -a | a | a | -a | -a | a | a | -a | -a | a | a | -a | -a | a | a | -a | -a | a | a | -a | -a | a | a | -a | -a | a | a | -a | -a | a |
| x | -v | -z | t | B | -r | -D | p | -E | -q | C | s | -A | -u | y | w | -w | -y | u | A | -s | -C | q | E | -p | D | r | -B | -t | z | v | -x |
| l | -j | -n | h | -o | -i | m | k | -k | -m | i | o | -h | n | j | -l | -l | j | n | -h | o | i | -m | -k | k | m | -i | -o | h | -n | -j | l |
| y | -s | -E | r | -z | -x | t | D | -q | A | w | -u | -C | p | -B | -v | v | B | -p | C | u | -w | -A | q | -D | -t | x | z | -r | E | s | -y |
| f | -d | g | e | -e | -g | d | -f | -f | d | -g | -e | e | g | -d | f | f | -d | g | e | -e | -g | d | -f | -f | d | -g | -e | e | g | -d | f |
| z | -p | A | y | -q | B | x | -r | C | w | -s | D | v | -t | E | u | -u | -E | t | -v | -D | s | -w | -C | r | -x | -B | q | -y | -A | p | -z |
| m | -h | l | n | -i | k | o | -j | j | -o | -k | i | -n | -l | h | -m | -m | h | -l | -n | i | -k | -o | j | -j | o | k | -i | n | l | -h | m |
| A | -r | v | -E | -w | q | -z | -B | s | -u | D | x | -p | y | C | -t | t | -C | -y | p | -x | -D | u | -s | B | z | -q | w | E | -v | r | -A |
| c | -b | b | -c | -c | b | -b | c | c | -b | b | -c | -c | b | -b | c | c | -b | b | -c | -c | b | -b | c | c | -b | b | -c | -c | b | -b | c |
| B | -u | q | -x | E | y | -r | t | -A | -C | v | -p | w | -D | -z | s | -s | z | D | -w | p | -v | C | A | -t | r | -y | -E | x | -q | u | -B |
| n | -k | h | -j | m | o | -l | i | -i | l | -o | -m | j | -h | k | -n | -n | k | -h | j | -m | -o | l | -i | i | -l | o | m | -j | h | -k | n |
| C | -x | s | -q | v | -A | -E | z | -u | p | -t | y | -D | -B | w | -r | r | -w | B | D | -y | t | -p | u | -z | E | A | -v | q | -s | x | -C |
| g | -f | e | -d | d | -e | f | -g | -g | f | -e | d | -d | e | -f | g | g | -f | e | -d | d | -e | f | -g | -g | f | -e | d | -d | e | -f | g |
| D | -A | x | -u | r | -p | s | -v | y | -B | E | C | -z | w | -t | q | -q | t | -w | z | -C | -E | B | -y | v | -s | p | -r | u | -x | A | -D |
| o | -n | m | -l | k | -j | i | -h | h | -i | j | -k | l | -m | n | -o | -o | n | -m | l | -k | j | -i | h | -h | i | -j | k | -l | m | -n | o |
| E | -D | C | -B | A | -z | y | -x | w | -v | u | -t | s | -r | q | -p | p | -q | r | -s | t | -u | v | -w | x | -y | z | -A | B | -C | D | -E |

(b) for the case that the frequency transform is a discrete sine transform:

$$\begin{vmatrix} a & b & c & d \\ c & c & e & -c \\ d & -a & -c & b \\ b & -d & c & -a \end{vmatrix}$$

the coefficient values being selected according to the data precision from values substantially equal to values listed in the following tables:

(a) for the case that the frequency transform is a discrete cosine transform:

| | 7-bit | 8-bit | 9-bit | 10-bit | 11-bit | 12-bit | 13-bit | 14-bit |
|---|---|---|---|---|---|---|---|---|
| a | 128 | 256 | 512 | 1024 | 2048 | 4096 | 8192 | 16384 |
| b | 166 | 332 | 665 | 1329 | 2658 | 5317 | 10633 | 21266 |
| c | 72 | 144 | 288 | 576 | 1153 | 2306 | 4612 | 9224 |
| d | 178 | 356 | 713 | 1426 | 2852 | 5703 | 11407 | 22813 |
| e | 150 | 301 | 601 | 1203 | 2406 | 4811 | 9622 | 19244 |
| f | 100 | 200 | 399 | 798 | 1596 | 3192 | 6385 | 12769 |
| g | 36 | 71 | 143 | 285 | 570 | 1141 | 2282 | 4563 |
| h | 181 | 361 | 722 | 1445 | 2890 | 5780 | 11560 | 23120 |
| i | 172 | 345 | 689 | 1379 | 2758 | 5516 | 11032 | 22063 |
| j | 160 | 320 | 639 | 1278 | 2556 | 5113 | 10225 | 20450 |
| k | 140 | 281 | 562 | 1123 | 2246 | 4493 | 8986 | 17972 |
| l | 114 | 229 | 458 | 915 | 1830 | 3660 | 7321 | 14642 |
| m | 87 | 174 | 347 | 694 | 1389 | 2777 | 5555 | 11109 |
| n | 50 | 101 | 201 | 403 | 806 | 1612 | 3223 | 6446 |
| o | 18 | 36 | 72 | 145 | 290 | 579 | 1158 | 2316 |
| p | 181 | 361 | 722 | 1444 | 2888 | 5777 | 11553 | 23106 |
| q | 179 | 357 | 714 | 1428 | 2856 | 5713 | 11426 | 22852 |

-continued

| | 7-bit | 8-bit | 9-bit | 10-bit | 11-bit | 12-bit | 13-bit | 14-bit |
|---|---|---|---|---|---|---|---|---|
| r | 175 | 351 | 701 | 1403 | 2806 | 5611 | 11222 | 22445 |
| s | 171 | 341 | 683 | 1365 | 2731 | 5462 | 10924 | 21848 |
| t | 164 | 328 | 656 | 1312 | 2624 | 5249 | 10497 | 20995 |
| u | 155 | 310 | 619 | 1238 | 2476 | 4952 | 9905 | 19810 |
| v | 145 | 291 | 581 | 1163 | 2325 | 4650 | 9301 | 18601 |
| w | 134 | 268 | 536 | 1071 | 2143 | 4286 | 8571 | 17143 |
| x | 123 | 246 | 491 | 982 | 1965 | 3929 | 7859 | 15718 |
| y | 108 | 216 | 433 | 866 | 1732 | 3463 | 6927 | 13853 |
| z | 92 | 184 | 367 | 734 | 1469 | 2937 | 5875 | 11749 |
| A | 77 | 154 | 308 | 615 | 1231 | 2461 | 4923 | 9846 |
| B | 62 | 124 | 247 | 494 | 988 | 1977 | 3954 | 7908 |
| C | 44 | 87 | 174 | 348 | 697 | 1393 | 2787 | 5573 |
| D | 26 | 51 | 103 | 205 | 410 | 820 | 1641 | 3281 |
| E | 7 | 15 | 30 | 59 | 118 | 236 | 473 | 946 |

| | 15-bit | 16-bit | 17-bit | 18-bit | 19-bit |
|---|---|---|---|---|---|
| a | 32768 | 65536 | 131072 | 262144 | 524288 |
| b | 42532 | 85065 | 170129 | 340259 | 680517 |
| c | 18448 | 36896 | 73791 | 147582 | 295164 |
| d | 45627 | 91253 | 182507 | 365014 | 730028 |
| e | 38489 | 76977 | 153954 | 307909 | 615817 |
| f | 25538 | 51077 | 102153 | 204306 | 408612 |
| g | 9126 | 18252 | 36504 | 73009 | 146018 |
| h | 46240 | 92479 | 184958 | 369917 | 739833 |
| i | 44126 | 88253 | 176506 | 353011 | 706022 |
| j | 40901 | 81802 | 163603 | 327207 | 654413 |
| k | 35944 | 71887 | 143775 | 287550 | 575099 |
| l | 29283 | 58566 | 117132 | 234265 | 468530 |
| m | 22219 | 44437 | 88874 | 177749 | 355498 |
| n | 12892 | 25784 | 51569 | 103137 | 206275 |
| o | 4632 | 9264 | 18528 | 37057 | 74113 |
| p | 46212 | 92424 | 184849 | 369697 | 739394 |
| q | 45704 | 91407 | 182815 | 365630 | 731260 |
| r | 44890 | 89779 | 179559 | 359118 | 718236 |
| s | 43695 | 87391 | 174781 | 349562 | 699125 |
| t | 41990 | 83979 | 167959 | 335918 | 671836 |
| u | 39619 | 79239 | 158477 | 316955 | 633909 |
| v | 37202 | 74404 | 148808 | 297616 | 595233 |
| w | 34285 | 68570 | 137140 | 274281 | 548561 |
| x | 31436 | 62871 | 125743 | 251486 | 502971 |
| y | 27706 | 55412 | 110825 | 221650 | 443299 |
| z | 23498 | 46997 | 93993 | 187986 | 375972 |
| A | 19692 | 39384 | 78767 | 157535 | 315070 |
| B | 15816 | 31631 | 63263 | 126525 | 253051 |
| C | 11146 | 22292 | 44584 | 89168 | 178337 |
| D | 6562 | 13124 | 26248 | 52497 | 104993 |
| E | 1891 | 3782 | 7564 | 15129 | 30258 |

| | 20-bit | 21-bit | 22-bit | 23-bit | 24-bit |
|---|---|---|---|---|---|
| a | 1048576 | 2097152 | 4194304 | 8388608 | 16777216 |
| b | 1361035 | 2722070 | 5444140 | 10888280 | 21776560 |
| c | 590328 | 1180657 | 2361314 | 4722627 | 9445255 |
| d | 1460056 | 2920112 | 5840224 | 11680448 | 23360895 |
| e | 1231635 | 2463269 | 4926539 | 9853077 | 19706155 |
| f | 817225 | 1634450 | 3268899 | 6537799 | 13075597 |
| g | 292035 | 584070 | 1168141 | 2336282 | 4672564 |
| h | 1479667 | 2959333 | 5918667 | 11837334 | 23674667 |
| i | 1412045 | 2824090 | 5648179 | 11296358 | 22592717 |
| j | 1308827 | 2617653 | 5235307 | 10470613 | 20941227 |
| k | 1150199 | 2300397 | 4600795 | 9201590 | 18403179 |
| l | 937060 | 1874119 | 3748238 | 7496477 | 14992954 |
| m | 710995 | 1421991 | 2843981 | 5687962 | 11375925 |
| n | 412549 | 825098 | 1650196 | 3300393 | 6600785 |
| o | 148227 | 296454 | 592908 | 1185815 | 2371630 |
| p | 1478788 | 2957576 | 5915152 | 11830305 | 23660609 |
| q | 1462520 | 2925040 | 5850080 | 11700160 | 23400319 |
| r | 1436472 | 2872944 | 5745888 | 11491775 | 22983550 |
| s | 1398249 | 2796498 | 5592996 | 11185992 | 22371984 |
| t | 1343671 | 2687342 | 5374684 | 10749368 | 21498736 |

-continued

| | 20-bit | 21-bit | 22-bit | 23-bit | 24-bit |
|---|---|---|---|---|---|
| u | 1267818 | 2535636 | 5071272 | 10142545 | 20285089 |
| v | 1190466 | 2380931 | 4761862 | 9523724 | 19047449 |
| w | 1097123 | 2194246 | 4388491 | 8776982 | 17553965 |
| x | 1005942 | 2011884 | 4023769 | 8047537 | 16095074 |
| y | 886598 | 1773197 | 3546394 | 7092787 | 14185574 |
| z | 751944 | 1503889 | 3007778 | 6015555 | 12031111 |
| A | 630139 | 1260278 | 2520556 | 5041112 | 10082224 |
| B | 506101 | 1012202 | 2024405 | 4048809 | 8097618 |
| C | 356674 | 713348 | 1426696 | 2853391 | 5706783 |
| D | 209987 | 419973 | 839947 | 1679894 | 3359787 |
| E | 60515 | 121030 | 242061 | 484122 | 968243 |

(b) for the case that the frequency transform is a discrete sine transform:

| | 7-bit | 8-bit | 9-bit | 10-bit | 11-bit | 12-bit | 13-bit | 14-bit |
|---|---|---|---|---|---|---|---|---|
| a | 58 | 116 | 232 | 464 | 928 | 1856 | 3712 | 7424 |
| b | 110 | 220 | 440 | 880 | 1760 | 3520 | 7040 | 14081 |
| c | 148 | 295 | 590 | 1181 | 2362 | 4723 | 9447 | 18893 |
| d | 168 | 336 | 672 | 1344 | 2688 | 5376 | 10753 | 21505 |
| e | 0 | 0 | 0 | 0 | 0 | 0 | 0 | 0 |

| | 15-bit | 16-bit | 17-bit | 18-bit | 19-bit |
|---|---|---|---|---|---|
| a | 14849 | 29698 | 59396 | 118791 | 237583 |
| b | 28162 | 56323 | 112647 | 225294 | 450588 |
| c | 37787 | 75573 | 151146 | 302292 | 604584 |
| d | 43011 | 86021 | 172043 | 344085 | 688170 |
| e | 0 | 0 | 0 | 0 | 0 |

| | 20-bit | 21-bit | 22-bit | 23-bit | 24-bit |
|---|---|---|---|---|---|
| a | 475165 | 950330 | 1900660 | 3801320 | 7602640 |
| b | 901175 | 1802350 | 3604700 | 7209400 | 14418800 |
| c | 1209169 | 2418337 | 4836675 | 9673350 | 19346700 |
| d | 1376340 | 2752680 | 5505360 | 11010720 | 22021440 |
| e | 0 | 0 | 0 | 0 | 0 |

2. A method according to clause 1, in which the coefficient values are equal to the selected values from the respective table.

3. A method according to clause 1 or clause 2, comprising selecting the data precision of the transform matrix according to the bit depth of the video data values.

4. A method according to clause 3, in which the selecting step comprises:

setting the data precision of the transform matrices to an offset number of bits less than the bit depth of the video data values.

5. A method according to clause 4, in which the offset number of bits is equal to 2 or 3.

6. A method according to any one of the preceding clauses, in which, for a discrete cosine transform of an array of N×N values, where N is a power of 2 smaller than 32, the subset $M_N[x][y]$ of values is defined by $$M_N[x][y]=M_{32}[x][(2^{(5-\log 2(N))})y] \text{ for } x,y=0 \ldots (N-1).$$

7. A method according to clause 6, in which N is 4, 8 or 16.

8. Image data encoded by the encoding method of any one of the preceding clauses.

9. A data carrier storing image data according to clause 8.

10. Computer software which, when executed by a computer, causes the computer to carry out the method of any one of the preceding clauses.

11. A non-transitory machine-readable storage medium on which computer software according to clause 8 is stored.

12. Data encoding apparatus for encoding an array of video data values, the apparatus comprising:

a frequency transform unit configured to frequency-transform the video data values according to a frequency transform, to generate an array of frequency-transformed values by a matrix-multiplication process using a transform matrix having a data precision greater than six bits, the transform matrix having coefficients defined by at least a subset of the following values:

(a) for the case that the frequency transform is a discrete cosine transform:

(b) for the case that the frequency transform is a discrete sine transform:

$$\begin{vmatrix} a & b & c & d \\ c & c & e & -c \\ d & -a & -c & b \\ b & -d & c & -a \end{vmatrix}$$

the coefficient values being selected according to the data precision from values substantially equal to values listed in the following tables:

(a) for the case that the frequency transform is a discrete cosine transform:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| a | a | a | a | a | a | a | a | a | a | a | a | a | a | a | a | a | a | a | a | a | a | a | a | a | a | a | a | a | a | a | a |
| p | q | r | s | t | u | v | w | x | y | z | A | B | C | D | E | -E | -D | -C | -B | -A | -z | -y | -x | -w | -v | -u | -t | -s | -r | -q | -p |
| h | i | j | k | l | m | n | o | -o | -n | -m | -l | -k | -j | -i | -h | -h | -i | -j | -k | -l | -m | -n | -o | o | n | m | l | k | j | l | h |
| q | t | w | z | C | -E | -B | -y | -v | -s | -p | -r | -u | -x | -A | -D | D | A | x | u | r | p | s | v | y | B | E | -C | -z | -w | -t | -q |
| d | e | f | g | -g | -f | -e | -d | -d | -e | -f | -g | g | f | e | d | d | e | f | g | -g | -f | -e | -d | -d | -e | -f | -g | g | f | e | d |
| r | w | B | -D | -y | -t | -p | -u | -z | -E | A | v | q | s | x | C | -C | -x | -s | -q | -v | -A | E | z | u | p | t | y | D | -B | -w | -r |
| i | l | o | -m | -j | -h | -k | -n | n | k | h | j | m | -o | -l | -i | -i | -l | -o | m | j | h | k | n | -n | -k | -h | -j | -m | o | l | i |
| s | z | -D | -w | -p | -v | -C | A | t | r | y | -E | -x | -q | -u | -B | B | u | q | x | E | -y | -r | -t | -A | C | v | p | w | D | -z | -s |
| b | c | -c | -b | -b | -c | c | b | b | c | -c | -b | -b | -c | c | b | b | c | -c | -b | -b | -c | c | b | b | c | -c | -b | -b | -c | c | b |
| t | C | -y | -p | -x | D | u | s | B | -z | -q | -w | E | v | r | A | -A | -r | -v | -E | w | q | z | -B | -s | -u | -D | x | p | y | -C | -t |
| j | o | -k | -i | -n | l | h | m | -m | -h | -l | n | i | k | -o | -j | -j | -o | k | i | n | -l | -h | -m | m | h | l | -n | -i | -k | o | j |
| u | -E | -t | -v | D | s | w | -C | -r | -x | B | q | y | -A | -p | -z | z | p | A | -y | -q | -B | x | r | C | -w | -s | -D | v | t | E | -u |
| e | -g | -d | -f | f | d | g | -e | -e | g | d | f | -f | -d | -g | e | e | -g | -d | -f | f | d | g | -e | -e | g | d | f | -f | -d | -g | e |
| v | -B | -p | -C | u | w | -A | -q | -D | t | x | -z | -r | -E | s | y | -y | -s | E | r | z | -x | -t | D | q | A | -w | -u | C | p | B | -v |
| k | -m | -i | o | h | n | -j | -l | l | j | -n | -h | -o | i | m | -k | -k | m | i | -o | -h | -n | j | l | -l | -j | n | h | o | -i | -m | k |
| w | -y | -u | A | s | -C | -q | E | p | D | -r | -B | t | z | -v | -x | x | v | -z | -t | B | r | -D | -p | -E | q | C | -s | -A | u | y | -w |
| a | -a | -a | a | a | -a | -a | a | a | -a | -a | a | a | -a | -a | a | a | -a | -a | a | a | -a | -a | a | a | -a | -a | a | a | -a | -a | a |
| x | -v | -z | t | B | -r | -D | p | -E | -q | C | s | -A | -u | y | w | -w | -y | u | A | -s | -C | q | E | -p | D | r | -B | -t | z | v | -x |
| l | -j | -n | h | -o | -i | m | k | -k | -m | i | o | -h | n | j | -l | -l | j | n | -h | o | i | -m | -k | k | m | -i | -o | h | -n | -j | l |
| y | -s | -E | r | -z | -x | t | D | -q | A | w | -u | -C | p | -B | -v | v | B | -p | C | u | -w | -A | q | -D | -t | x | z | -r | E | s | -y |
| f | -d | g | e | -e | -g | d | -f | -f | d | -g | -e | e | g | -d | f | f | -d | g | e | -e | -g | d | -f | -f | d | -g | -e | e | g | -d | f |
| z | -p | A | y | -q | B | x | -r | C | w | -s | D | v | -t | E | u | -u | -E | t | -v | -D | s | -w | -C | r | -x | -B | q | -y | -A | p | -z |
| m | -h | l | n | -i | k | o | -j | j | -o | -k | i | -n | -l | h | -m | -m | h | -l | -n | i | -k | -o | j | -j | o | k | -i | n | l | -h | m |
| A | -r | v | -E | -w | q | -z | -B | s | -u | D | x | -p | y | C | -t | t | -C | -y | p | -x | -D | u | -s | B | z | -q | w | E | -v | r | -A |
| c | -b | b | -c | -c | b | -b | c | c | -b | b | -c | -c | b | -b | c | c | -b | b | -c | -c | b | -b | c | c | -b | b | -c | -c | b | -b | c |
| B | -u | q | -x | E | y | -r | t | -A | -C | v | -p | w | -D | -z | s | -s | z | D | -w | p | -v | C | A | -t | r | -y | -E | x | -q | u | -B |
| n | -k | h | -j | m | o | -l | i | -i | l | -o | -m | j | -h | k | -n | -n | k | -h | j | -m | -o | l | -i | i | -l | o | m | -j | h | -k | n |
| C | -x | s | -q | v | -A | -E | z | -u | p | -t | y | -D | -B | w | -r | r | -w | B | D | -y | t | -p | u | -z | E | A | -v | q | -s | x | -C |
| g | -f | e | -d | d | -e | f | -g | -g | f | -e | d | -d | e | -f | g | g | -f | e | -d | d | -e | f | -g | -g | f | -e | d | -d | e | -f | g |
| D | -A | x | -u | r | -p | s | -v | y | -B | E | C | -z | w | -t | q | -q | t | -w | z | -C | -E | B | -y | v | -s | p | -r | u | -x | A | -D |
| o | -n | m | -l | k | -j | i | -h | h | -i | j | -k | l | -m | n | -o | -o | n | -m | l | -k | j | -i | h | -h | i | -j | k | -l | m | -n | o |
| E | -D | C | -B | A | -z | y | -x | w | -v | u | -t | s | -r | q | -p | p | -q | r | -s | t | -u | v | -w | x | -y | z | -A | B | -C | D | -E |

| | 7-bit | 8-bit | 9-bit | 10-bit | 11-bit | 12-bit | 13-bit | 14-bit |
|---|---|---|---|---|---|---|---|---|
| a | 128 | 256 | 512 | 1024 | 2048 | 4096 | 8192 | 16384 |
| b | 166 | 332 | 665 | 1329 | 2658 | 5317 | 10633 | 21266 |
| c | 72 | 144 | 288 | 576 | 1153 | 2306 | 4612 | 9224 |
| d | 178 | 356 | 713 | 1426 | 2852 | 5703 | 11407 | 22813 |
| e | 150 | 301 | 601 | 1203 | 2406 | 4811 | 9622 | 19244 |
| f | 100 | 200 | 399 | 798 | 1596 | 3192 | 6385 | 12769 |
| g | 36 | 71 | 143 | 285 | 570 | 1141 | 2282 | 4563 |
| h | 181 | 361 | 722 | 1445 | 2890 | 5780 | 11560 | 23120 |
| i | 172 | 345 | 689 | 1379 | 2758 | 5516 | 11032 | 22063 |
| j | 160 | 320 | 639 | 1278 | 2556 | 5113 | 10225 | 20450 |
| k | 140 | 281 | 562 | 1123 | 2246 | 4493 | 8986 | 17972 |
| l | 114 | 229 | 458 | 915 | 1830 | 3660 | 7321 | 14642 |
| m | 87 | 174 | 347 | 694 | 1389 | 2111 | 5555 | 11109 |
| n | 50 | 101 | 201 | 403 | 806 | 1612 | 3223 | 6446 |
| o | 18 | 36 | 72 | 145 | 290 | 579 | 1158 | 2316 |
| p | 181 | 361 | 722 | 1444 | 2888 | 5777 | 11553 | 23106 |
| q | 179 | 357 | 714 | 1428 | 2856 | 5713 | 11426 | 22852 |
| r | 175 | 351 | 701 | 1403 | 2806 | 5611 | 11222 | 22445 |
| s | 171 | 341 | 683 | 1365 | 2731 | 5462 | 10924 | 21848 |
| t | 164 | 328 | 656 | 1312 | 2624 | 5249 | 10497 | 20995 |
| u | 155 | 310 | 619 | 1238 | 2476 | 4952 | 9905 | 19810 |
| v | 145 | 291 | 581 | 1163 | 2325 | 4650 | 9301 | 18601 |
| w | 134 | 268 | 536 | 1071 | 2143 | 4286 | 8571 | 17143 |
| x | 123 | 246 | 491 | 982 | 1965 | 3929 | 7859 | 15718 |
| y | 108 | 216 | 433 | 866 | 1732 | 3463 | 6927 | 13853 |
| z | 92 | 184 | 367 | 734 | 1469 | 2937 | 5875 | 11749 |
| A | 77 | 154 | 308 | 615 | 1231 | 2461 | 4923 | 9846 |
| B | 62 | 124 | 247 | 494 | 988 | 1977 | 3954 | 7908 |
| C | 44 | 87 | 174 | 348 | 697 | 1393 | 2787 | 5573 |
| D | 26 | 51 | 103 | 205 | 410 | 820 | 1641 | 3281 |
| E | 7 | 15 | 30 | 59 | 118 | 236 | 473 | 946 |

| | 15-bit | 16-bit | 17-bit | 18-bit | 19-bit |
|---|---|---|---|---|---|
| a | 32768 | 65536 | 131072 | 262144 | 524288 |
| b | 42532 | 85065 | 170129 | 340259 | 680517 |
| c | 18448 | 36896 | 73791 | 147582 | 295164 |
| d | 45627 | 91253 | 182507 | 365014 | 730028 |
| e | 38489 | 76977 | 153954 | 307909 | 615817 |
| f | 25538 | 51077 | 102153 | 204306 | 408612 |
| g | 9126 | 18252 | 36504 | 73009 | 146018 |
| h | 46240 | 92479 | 184958 | 369917 | 739833 |
| i | 44126 | 88253 | 176506 | 353011 | 706022 |
| j | 40901 | 81802 | 163603 | 327207 | 654413 |
| k | 35944 | 71887 | 143775 | 287550 | 575099 |
| l | 29283 | 58566 | 117132 | 234265 | 468530 |
| m | 22219 | 44437 | 88874 | 177749 | 355498 |
| n | 12892 | 25784 | 51569 | 103137 | 206275 |
| o | 4632 | 9264 | 18528 | 37057 | 74113 |
| p | 46212 | 92424 | 184849 | 369697 | 739394 |
| q | 45704 | 91407 | 182815 | 365630 | 731260 |
| r | 44890 | 89779 | 179559 | 359118 | 718236 |
| s | 43695 | 87391 | 174781 | 349562 | 699125 |
| t | 41990 | 83979 | 167959 | 335918 | 671836 |
| u | 39619 | 79239 | 158477 | 316955 | 633909 |
| v | 37202 | 74404 | 148808 | 297616 | 595233 |
| w | 34285 | 68570 | 137140 | 274281 | 548561 |
| x | 31436 | 62871 | 125743 | 251486 | 502971 |
| y | 27706 | 55412 | 110825 | 221650 | 443299 |
| z | 23498 | 46997 | 93993 | 187986 | 375972 |
| A | 19692 | 39384 | 78767 | 157535 | 315070 |
| B | 15816 | 31631 | 63263 | 126525 | 253051 |
| C | 11146 | 22292 | 44584 | 89168 | 178337 |
| D | 6562 | 13124 | 26248 | 52497 | 104993 |
| E | 1891 | 3782 | 7564 | 15129 | 30258 |

| | 20-bit | 21-bit | 22-bit | 23-bit | 24-bit |
|---|---|---|---|---|---|
| a | 1048576 | 2097152 | 4194304 | 8388608 | 16777216 |
| b | 1361035 | 2722070 | 5444140 | 10888280 | 21776560 |
| c | 590328 | 1180657 | 2361314 | 4722627 | 9445255 |
| d | 1460056 | 2920112 | 5840224 | 11680448 | 23360895 |
| e | 1231635 | 2463269 | 4926539 | 9853077 | 19706155 |

-continued

| | 20-bit | 21-bit | 22-bit | 23-bit | 24-bit |
|---|---|---|---|---|---|
| f | 817225 | 1634450 | 3268899 | 6537799 | 13075597 |
| g | 292035 | 584070 | 1168141 | 2336282 | 4672564 |
| h | 1479667 | 2959333 | 5918667 | 11837334 | 23674667 |
| i | 1412045 | 2824090 | 5648179 | 11296358 | 22592717 |
| j | 1308827 | 2617653 | 5235307 | 10470613 | 20941227 |
| k | 1150199 | 2300397 | 4600795 | 9201590 | 18403179 |
| l | 937060 | 1874119 | 3748238 | 7496477 | 14992954 |
| m | 710995 | 1421991 | 2843981 | 5687962 | 11375925 |
| n | 412549 | 825098 | 1650196 | 3300393 | 6600785 |
| o | 148227 | 296454 | 592908 | 1185815 | 2371630 |
| p | 1478788 | 2957576 | 5915152 | 11830305 | 23660609 |
| q | 1462520 | 2925040 | 5850080 | 11700160 | 23400319 |
| r | 1436472 | 2872944 | 5745888 | 11491775 | 22983550 |
| s | 1398249 | 2796498 | 5592996 | 11185992 | 22371984 |
| t | 1343671 | 2687342 | 5374684 | 10749368 | 21498736 |
| u | 1267818 | 2535636 | 5071272 | 10142545 | 20285089 |
| v | 1190466 | 2380931 | 4761862 | 9523724 | 19047449 |
| w | 1097123 | 2194246 | 4388491 | 8776982 | 17553965 |
| x | 1005942 | 2011884 | 4023769 | 8047537 | 16095074 |
| y | 886598 | 1773197 | 3546394 | 7092787 | 14185574 |
| z | 751944 | 1503889 | 3007778 | 6015555 | 12031111 |
| A | 630139 | 1260278 | 2520556 | 5041112 | 10082224 |
| B | 506101 | 1012202 | 2024405 | 4048809 | 8097618 |
| C | 356674 | 713348 | 1426696 | 2853391 | 5706783 |
| D | 209987 | 419973 | 839947 | 1679894 | 3359787 |
| E | 60515 | 121030 | 242061 | 484122 | 968243 |

(b) for the case that the frequency transform is a discrete sine transform:

| | 7-bit | 8-bit | 9-bit | 10-bit | 11-bit | 12-bit | 13-bit | 14-bit |
|---|---|---|---|---|---|---|---|---|
| a | 58 | 116 | 232 | 464 | 928 | 1856 | 3712 | 7424 |
| b | 110 | 220 | 440 | 880 | 1760 | 3520 | 7040 | 14081 |
| c | 148 | 295 | 590 | 1181 | 2362 | 4723 | 9447 | 18893 |
| d | 168 | 336 | 672 | 1344 | 2688 | 5376 | 10753 | 21505 |
| e | 0 | 0 | 0 | 0 | 0 | 0 | 0 | 0 |

| | 15-bit | 16-bit | 17-bit | 18-bit | 19-bit |
|---|---|---|---|---|---|
| a | 14849 | 29698 | 59396 | 118791 | 237583 |
| b | 28162 | 56323 | 112647 | 225294 | 450588 |
| c | 37787 | 75573 | 151146 | 302292 | 604584 |
| d | 43011 | 86021 | 172043 | 344085 | 688170 |
| e | 0 | 0 | 0 | 0 | 0 |

| | 20-bit | 21-bit | 22-bit | 23-bit | 24-bit |
|---|---|---|---|---|---|
| a | 475165 | 950330 | 1900660 | 3801320 | 7602640 |
| b | 901175 | 1802350 | 3604700 | 7209400 | 14418800 |
| c | 1209169 | 2418337 | 4836675 | 9673350 | 19346700 |
| d | 1376340 | 2752680 | 5505360 | 11010720 | 22021440 |
| e | 0 | 0 | 0 | 0 | 0 |

13. Apparatus according to clause 12, in which the coefficient values are equal to the selected values from the respective table.

14. Apparatus according to clause 12 or clause 13, in which the frequency transform unit is configured to select the data precision of the transform matrix according to the bit depth of the video data values.

15. Apparatus according to clause 14, in which the frequency transform unit is configured to set the data precision of the transform matrices to an offset number of bits less than the bit depth of the video data values.

16. Apparatus according to clause 15, in which the offset number of bits is equal to 2 or 3.

17. Apparatus according to any one of clauses 12 to 16, in which, for a discrete cosine transform of an array of N×N values, where N is a power of 2 smaller than 32, the subset $M_N[x][y]$ of values is defined by:

$$M_N[x][y]=M_{32}[x][(2^{(5-\log 2(N))})y],\ \text{for}\ x,y=0\ \ldots\ (N-1).$$

18. Apparatus according to clause 17, in which N is 4, 8 or 16.

19. Video data capture, transmission, display and/or storage apparatus comprising apparatus according to any one of clauses 12 to 18.

Data Signals

It will be appreciated that data signals generated by the variants of coding apparatus discussed above, and storage or transmission media carrying such signals, are considered to represent embodiments of the present disclosure.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be apparent that numerous modifications and variations of the present disclosure are possible in light of the above teachings. It is therefore to be understood that within the scope of the appended claims, the technology may be practiced otherwise than as specifically described herein.

The invention claimed is:

1. A video data encoding method for encoding an array of video data values, the method comprising:

frequency-transforming the video data values according to a frequency transform; and generating an array of frequency-transformed values by a matrix-multiplication process using a transform matrix having a data precision greater than six bits, the transform matrix being matched to an inverse transform that has a data precision of six bits and is used to decode the video data values, the transform matrix having coefficients defined by at least a subset of the following values, wherein each letter indicates a respective coefficient value:

(a) when the frequency transform is a discrete cosine transform:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| a | a | a | a | a | a | a | a | a | a | a | a | a | a | a | a | a | a | a | a | a | a | a | a | a | a | a | a | a | a | a | a |
| p | q | r | s | t | u | v | w | x | y | z | A | B | C | D | E | -E | -D | -C | -B | -A | -z | -y | -x | -w | -v | -u | -t | -s | -r | -q | -p |
| h | i | j | k | l | m | n | o | -o | -n | -m | -1 | -k | -j | -i | -h | -h | -i | -j | -k | -l | -m | -n | -o | o | n | m | l | k | j | i | h |
| q | t | w | z | C | -E | -B | -y | -v | -s | -p | -r | -u | -x | -A | -D | D | A | x | u | r | p | s | v | y | B | E | -C | -z | -w | -t | -q |
| d | e | f | g | -g | -f | -e | -d | -d | -e | -f | -g | g | f | e | d | d | e | f | g | -g | -f | -e | -d | -d | -e | -f | -g | g | f | e | d |
| r | w | B | -D | -y | -t | -p | -u | -z | -E | A | v | q | s | x | C | -C | -x | -s | -q | -v | -A | E | z | u | p | t | y | D | -B | -w | -r |
| i | l | o | -m | -j | -h | -k | -n | n | k | h | j | m | -o | -l | -i | -i | -l | -o | m | j | h | k | n | -n | -k | -h | -j | -m | o | l | i |
| s | z | -D | -w | -p | -v | -C | A | t | r | y | -E | -x | -q | -u | -B | B | u | q | x | E | -y | -r | -t | -A | C | v | p | w | D | -z | -s |
| b | c | -c | -b | -b | -c | c | b | b | c | -c | -b | -b | -c | c | b | b | c | -c | -b | -b | -c | c | b | b | c | -c | -b | -b | -c | c | b |
| t | C | -y | -p | -x | D | u | s | B | -z | -q | -w | E | v | r | A | -A | -r | -v | -E | w | q | z | -B | -s | -u | -D | x | p | y | -C | -t |
| j | o | -k | -i | -n | l | h | m | -m | -h | -l | n | i | k | -o | -j | -j | -o | k | i | n | -l | -h | -m | m | h | l | -n | -i | -k | o | j |
| u | -E | -t | -v | D | s | w | -C | -r | -x | B | q | y | -A | -p | -z | z | p | A | -y | -q | -B | x | r | C | -w | -s | -D | v | t | E | -u |
| e | -g | -d | -f | f | d | g | -e | -e | g | d | f | -f | -d | -g | e | e | -g | -d | -f | f | d | g | -e | -e | g | d | f | -f | -d | -g | e |
| v | -B | -p | -C | u | w | -A | -q | -D | t | x | -z | -r | -E | s | y | -y | -s | E | r | z | -x | -t | D | q | A | -w | -u | C | p | B | -v |
| k | -m | -i | o | h | n | -j | -l | l | j | -n | -h | -o | i | m | -k | -k | m | i | -o | -h | -n | j | l | -l | -j | n | h | o | -i | -m | k |
| w | -y | -u | A | s | -C | -q | E | p | D | -r | B | t | z | -v | -x | X | v | -z | -t | B | r | -D | -p | -E | q | C | -s | -A | u | y | -w |
| a | -a | -a | a | a | -a | -a | a | a | -a | -a | a | a | -a | -a | a | a | -a | -a | a | a | -a | -a | a | a | -a | -a | a | a | -a | -a | a |
| x | -v | -z | t | B | -r | -D | p | -E | -q | C | s | -A | -u | y | w | -w | -y | u | A | -s | -C | q | E | -p | D | r | -B | -t | z | v | -x |
| l | -j | -n | h | -o | -i | m | k | -k | -m | i | o | -h | n | j | -l | -l | j | n | -h | o | i | -m | -k | k | m | -i | -o | h | -n | -j | l |
| y | -s | -E | r | -z | -x | t | D | -q | A | w | -u | -C | p | -B | -v | v | B | -p | C | u | -w | -A | q | -D | -t | x | z | -r | E | s | -y |
| f | -d | g | e | -e | -g | d | -f | -f | d | -g | -e | e | g | -d | f | f | -d | g | e | -e | -g | d | -f | -f | d | -g | -e | e | g | -d | f |
| z | -p | A | y | -q | B | x | -r | C | w | -s | D | v | -t | E | u | -u | -E | t | -v | -D | s | -w | -C | r | -x | -B | q | -y | -A | p | -z |
| m | -h | l | n | -i | k | o | -j | j | -o | -k | i | -n | -l | h | -m | -m | h | -l | -n | i | -k | -o | j | -j | o | k | -i | n | l | -h | m |
| A | -r | v | -E | -w | q | -z | -B | s | -u | D | x | -p | y | C | -t | t | -C | -y | p | -x | D | u | -s | B | z | -q | w | E | -v | r | -A |
| c | -b | b | -c | -c | b | -b | c | c | -b | b | -c | -c | b | -b | c | c | -b | b | -c | -c | b | -b | c | c | -b | b | -c | -c | b | -b | c |
| B | -u | q | -x | E | y | -r | t | -A | -C | v | -p | w | -D | -z | s | -s | z | D | -w | p | -v | C | A | -t | r | -y | -E | x | -q | u | -B |
| n | -k | h | -j | m | o | -l | i | -i | l | -o | -m | j | -h | k | -n | -n | k | -h | j | -m | -o | l | -i | i | -l | o | m | -j | h | -k | n |
| C | -x | s | -q | v | -A | -E | z | -u | p | -t | y | -D | -B | w | -r | r | w | B | D | -y | t | -p | u | -z | E | A | -v | q | -s | x | -C |
| g | -f | e | -d | d | -e | f | -g | -g | f | -e | d | -d | e | -f | g | g | -f | e | -d | d | -e | f | -g | -g | f | -e | d | -d | e | -f | g |
| D | -A | x | -u | r | -p | s | -v | y | -B | E | C | -z | w | -t | q | -q | t | -w | z | -C | -E | B | -y | v | -s | p | -r | u | -x | A | -D |
| o | -n | m | -l | k | -j | i | -h | h | -i | j | -k | l | -m | n | -o | -o | n | -m | l | -k | j | -i | h | -h | i | -j | k | -l | m | -n | o |
| E | -D | C | -B | A | -z | y | -x | w | -v | u | -t | s | -r | q | -p | p | -q | r | -s | t | -u | v | -w | x | -y | z | -A | B | -C | D | -E |

(b) when the frequency transform is a discrete sine transform:

$$\begin{vmatrix} a & b & c & d \\ c & c & e & -c \\ d & -a & -c & b \\ b & -d & c & -a \end{vmatrix}$$

the coefficient values being selected according to the data precision from values equal to values listed in the following tables:

(a) when the frequency transform is a discrete cosine transform:

| | 7-bit | 8-bit | 9-bit | 10-bit | 11-bit | 12-bit | 13-bit | 14-bit |
|---|---|---|---|---|---|---|---|---|
| a | 128 | 256 | 512 | 1024 | 2048 | 4096 | 8192 | 16384 |
| b | 166 | 332 | 665 | 1329 | 2658 | 5317 | 10633 | 21266 |
| c | 72 | 144 | 288 | 576 | 1153 | 2306 | 4612 | 9224 |
| d | 178 | 356 | 713 | 1426 | 2852 | 5703 | 11407 | 22813 |
| e | 150 | 301 | 601 | 1203 | 2406 | 4811 | 9622 | 19244 |
| f | 100 | 200 | 399 | 798 | 1596 | 3192 | 6385 | 12769 |
| g | 36 | 71 | 143 | 285 | 570 | 1141 | 2282 | 4563 |
| h | 181 | 361 | 722 | 1445 | 2890 | 5780 | 11560 | 23120 |
| i | 172 | 345 | 689 | 1379 | 2758 | 5516 | 11032 | 22063 |
| j | 160 | 320 | 639 | 1278 | 2556 | 5113 | 10225 | 20450 |
| k | 140 | 281 | 562 | 1123 | 2246 | 4493 | 8986 | 17972 |
| l | 114 | 229 | 458 | 915 | 1830 | 3660 | 7321 | 14642 |
| m | 87 | 174 | 347 | 694 | 1389 | 2777 | 5555 | 11109 |
| n | 50 | 101 | 201 | 403 | 806 | 1612 | 3223 | 6446 |
| o | 18 | 36 | 72 | 145 | 290 | 579 | 1158 | 2316 |
| p | 181 | 361 | 722 | 1444 | 2888 | 5777 | 11553 | 23106 |
| q | 179 | 357 | 714 | 1428 | 2856 | 5713 | 11426 | 22852 |
| r | 175 | 351 | 701 | 1403 | 2806 | 5611 | 11222 | 22445 |
| s | 171 | 341 | 683 | 1365 | 2731 | 5462 | 10924 | 21848 |
| t | 164 | 328 | 656 | 1312 | 2624 | 5249 | 10497 | 20995 |
| u | 155 | 310 | 619 | 1238 | 2476 | 4952 | 9905 | 19810 |
| v | 145 | 291 | 581 | 1163 | 2325 | 4650 | 9301 | 18601 |
| w | 134 | 268 | 536 | 1071 | 2143 | 4286 | 8571 | 17143 |
| x | 123 | 246 | 491 | 982 | 1965 | 3929 | 7859 | 15718 |
| y | 108 | 216 | 433 | 866 | 1732 | 3463 | 6927 | 13853 |
| z | 92 | 184 | 367 | 734 | 1469 | 2937 | 5875 | 11749 |
| A | 77 | 154 | 308 | 615 | 1231 | 2461 | 4923 | 9846 |
| B | 62 | 124 | 247 | 494 | 988 | 1977 | 3954 | 7908 |
| C | 44 | 87 | 174 | 348 | 697 | 1393 | 2787 | 5573 |
| D | 26 | 51 | 103 | 205 | 410 | 820 | 1641 | 3281 |
| E | 7 | 15 | 30 | 59 | 118 | 236 | 473 | 946 |

| | 15-bit | 16-bit | 17-bit | 18-bit | 19-bit |
|---|---|---|---|---|---|
| a | 32768 | 65536 | 131072 | 262144 | 524288 |
| b | 42532 | 85065 | 170129 | 340259 | 680517 |
| c | 18448 | 36896 | 73791 | 147582 | 295164 |
| d | 45627 | 91253 | 182507 | 365014 | 730028 |
| e | 38489 | 76977 | 153954 | 307909 | 615817 |
| f | 25538 | 51077 | 102153 | 204306 | 408612 |
| g | 9126 | 18252 | 36504 | 73009 | 146018 |
| h | 46240 | 92479 | 184958 | 369917 | 739833 |
| i | 44126 | 88253 | 176506 | 353011 | 706022 |
| j | 40901 | 81802 | 163603 | 327207 | 654413 |
| k | 35944 | 71887 | 143775 | 287550 | 575099 |
| l | 29283 | 58566 | 117132 | 234265 | 468530 |
| m | 22219 | 44437 | 88874 | 177749 | 355498 |
| n | 12892 | 25784 | 51569 | 103137 | 206275 |
| o | 4632 | 9264 | 18528 | 37057 | 74113 |
| p | 46212 | 92424 | 184849 | 369697 | 739394 |
| q | 45704 | 91407 | 182815 | 365630 | 731260 |
| r | 44890 | 89779 | 179559 | 359118 | 718236 |
| s | 43695 | 87391 | 174781 | 349562 | 699125 |
| t | 41990 | 83979 | 167959 | 335918 | 671836 |
| u | 39619 | 79239 | 158477 | 316955 | 633909 |
| v | 37202 | 74404 | 148808 | 297616 | 595233 |
| w | 34285 | 68570 | 137140 | 274281 | 548561 |
| x | 31436 | 62871 | 125743 | 251486 | 502971 |
| y | 27706 | 55412 | 110825 | 221650 | 443299 |
| z | 23498 | 46997 | 93993 | 187986 | 375972 |
| A | 19692 | 39384 | 78767 | 157535 | 315070 |
| B | 15816 | 31631 | 63263 | 126525 | 253051 |
| C | 11146 | 22292 | 44584 | 89168 | 178337 |
| D | 6562 | 13124 | 26248 | 52497 | 104993 |
| E | 1891 | 3782 | 7564 | 15129 | 30258 |

| | 20-bit | 21-bit | 22-bit | 23-bit | 24-bit |
|---|---|---|---|---|---|
| a | 1048576 | 2097152 | 4194304 | 8388608 | 16777216 |
| b | 1361035 | 2722070 | 5444140 | 10888280 | 21776560 |
| c | 590328 | 1180657 | 2361314 | 4722627 | 9445255 |
| d | 1460056 | 2920112 | 5840224 | 11680448 | 23360895 |
| e | 1231635 | 2463269 | 4926539 | 9853077 | 19706155 |
| f | 817225 | 1634450 | 3268899 | 6537799 | 13075597 |
| g | 292035 | 584070 | 1168141 | 2336282 | 4672564 |
| h | 1479667 | 2959333 | 5918667 | 11837334 | 23674667 |
| i | 1412045 | 2824090 | 5648179 | 11296358 | 22592717 |
| j | 1308827 | 2617653 | 5235307 | 10470613 | 20941227 |
| k | 1150199 | 2300397 | 4600795 | 9201590 | 18403179 |
| l | 937060 | 1874119 | 3748238 | 7496477 | 14992954 |
| m | 710995 | 1421991 | 2843981 | 5687962 | 11375925 |
| n | 412549 | 825098 | 1650196 | 3300393 | 6600785 |
| o | 148227 | 296454 | 592908 | 1185815 | 2371630 |
| p | 1478788 | 2957576 | 5915152 | 11830305 | 23660609 |
| q | 1462520 | 2925040 | 5850080 | 11700160 | 23400319 |
| r | 1436472 | 2872944 | 5745888 | 11491775 | 22983550 |
| s | 1398249 | 2796498 | 5592996 | 11185992 | 22371984 |
| t | 1343671 | 2687342 | 5374684 | 10749368 | 21498736 |
| u | 1267818 | 2535636 | 5071272 | 10142545 | 20285089 |
| v | 1190466 | 2380931 | 4761862 | 9523724 | 19047449 |
| w | 1097123 | 2194246 | 4388491 | 8776982 | 17553965 |
| x | 1005942 | 2011884 | 4023769 | 8047537 | 16095074 |
| y | 886598 | 1773197 | 3546394 | 7092787 | 14185574 |
| z | 751944 | 1503889 | 3007778 | 6015555 | 12031111 |
| A | 630139 | 1260278 | 2520556 | 5041112 | 10082224 |
| B | 506101 | 1012202 | 2024405 | 4048809 | 8097618 |
| C | 356674 | 713348 | 1426696 | 2853391 | 5706783 |
| D | 209987 | 419973 | 839947 | 1679894 | 3359787 |
| E | 60515 | 121030 | 242061 | 484122 | 968243 |

(b) when the frequency transform is a discrete sine transform:

| | 7-bit | 8-bit | 9-bit | 10-bit | 11-bit | 12-bit | 13-bit | 14-bit |
|---|---|---|---|---|---|---|---|---|
| a | 58 | 116 | 232 | 464 | 928 | 1856 | 3712 | 7424 |
| b | 110 | 220 | 440 | 880 | 1760 | 3520 | 7040 | 14081 |
| c | 148 | 295 | 590 | 1181 | 2362 | 4723 | 9447 | 18893 |
| d | 168 | 336 | 672 | 1344 | 2688 | 5376 | 10753 | 21505 |
| e | 0 | 0 | 0 | 0 | 0 | 0 | 0 | 0 |

| | 15-bit | 16-bit | 17-bit | 18-bit | 19-bit |
|---|---|---|---|---|---|
| a | 14849 | 29698 | 59396 | 118791 | 237583 |
| b | 28162 | 56323 | 112647 | 225294 | 450588 |
| c | 37787 | 75573 | 151146 | 302292 | 604584 |
| d | 43011 | 86021 | 172043 | 344085 | 688170 |
| e | 0 | 0 | 0 | 0 | 0 |

| | 20-bit | 21-bit | 22-bit | 23-bit | 24-bit |
|---|---|---|---|---|---|
| a | 475165 | 950330 | 1900660 | 3801320 | 7602640 |
| b | 901175 | 1802350 | 3604700 | 7209400 | 14418800 |
| c | 1209169 | 2418337 | 4836675 | 9673350 | 19346700 |
| d | 1376340 | 2752680 | 5505360 | 11010720 | 22021440 |
| e | 0 | 0 | 0 | 0 | 0 |

the method further comprising setting the data precision of the transform matrix to three bits less than a bit depth of the video data values but greater than six bits.

2. The method according to claim 1, wherein the coefficient values are equal to the selected values from the respective table.

3. The method according to claim 1, wherein, for a discrete cosine transform of an array of N×N values, where N is a power of 2 smaller than 32, the subset $M_N[x][y]$ of values is defined by $$M_N[x][y]=M_{32}[x][(2^{(5-\log 2(N))})y] \text{ for } x,y=0 \ldots (N-1).$$

4. The method according to claim 3, wherein N is 4, 8 or 16.

5. A non-transitory computer readable medium including computer program instructions which when executed by a computer cause the computer to perform the method of claim 1.

6. A data encoding apparatus for encoding an array of video data values, the apparatus comprising:

frequency transform circuitry configured to frequency-transform the video data values according to a frequency transform, to generate an array of frequency-transformed values by a matrix-multiplication process using a transform matrix having a data precision greater than six bits, the transform matrix being matched to an inverse transform that has a data precision of six bits and is used to decode the video data values, the transform matrix having coefficients defined by at least a subset of the following values, wherein each letter indicates a respective coefficient value:

(a) when the frequency transform is a discrete cosine transform:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| a | a | a | a | a | a | a | a | a | a | a | a | a | a | a | a | a | a | a | a | a | a | a | a | a | a | a | a | a | a | a | a |
| p | q | r | s | t | u | v | w | x | y | z | A | B | C | D | E | -E | -D | -C | -B | -A | -z | -y | -x | -w | -v | -u | -t | -s | -r | -q | -p |
| h | i | j | k | l | m | n | o | -o | -n | -m | -l | -k | -j | -i | -h | -h | -i | -j | -k | -l | -m | -n | -o | o | n | m | l | k | j | l | h |
| q | t | w | z | C | -E | -B | -y | -v | -s | -p | -r | -u | -x | -A | -D | D | A | x | u | r | p | s | v | y | B | E | -C | -z | -w | -t | -q |
| d | e | f | g | -g | -f | -e | -d | -d | -e | -f | -g | g | f | e | d | d | e | f | g | -g | -f | -e | -d | -d | -e | -f | -g | g | f | e | d |
| r | w | B | -D | -y | -t | -p | -u | -z | -E | A | v | q | s | x | C | -C | -x | -s | -q | -v | -A | E | z | u | p | t | y | D | -B | -w | -r |
| i | l | o | -m | -j | -h | -k | -n | n | k | h | j | m | -o | -l | -i | -i | -l | -o | m | j | h | k | n | -n | -k | -h | -j | -m | o | l | i |
| s | z | -D | -w | -p | -v | -C | A | t | r | y | -E | -x | -q | -u | -B | B | u | q | x | E | -y | -r | -t | -A | C | v | p | w | D | -z | -s |
| b | c | -c | -b | -b | -c | c | b | b | c | -c | -b | -b | -c | c | b | b | c | -c | -b | -b | -c | c | b | b | c | -c | -b | -b | -c | c | b |
| t | C | -y | -p | -x | D | u | s | B | -z | -q | -w | E | v | r | A | -A | -r | -v | -E | w | q | z | -B | -s | -u | -D | x | p | y | -C | -t |
| j | o | -k | -i | -n | l | h | m | -m | -h | -l | n | i | k | -o | -j | -j | -o | k | i | n | -l | -h | -m | m | h | l | -n | -i | -k | o | j |
| u | -E | -t | -v | D | s | w | -C | -r | -x | B | q | y | -A | -p | -z | z | p | A | -y | -q | -B | x | r | C | -w | -s | -D | v | t | E | -u |
| e | -g | -d | -f | f | d | g | -e | -e | g | d | f | -f | -d | -g | e | e | -g | -d | -f | f | d | g | -e | -e | g | d | f | -f | -d | -g | e |
| v | -B | -p | -C | u | w | -A | -q | -D | t | x | -z | -r | -E | s | y | -y | -s | E | r | z | -x | -t | D | q | A | -w | -u | C | p | B | -v |
| k | -m | -i | o | h | n | -j | -l | l | j | -n | -h | -o | i | m | -k | -k | m | i | -o | -h | -n | j | l | -l | -j | n | h | o | -i | -m | k |
| w | -y | -u | A | s | -C | -q | E | p | D | -r | -B | t | z | -v | -x | x | v | -z | -t | B | r | -D | -p | -E | q | C | -s | -A | u | y | -w |
| a | -a | -a | a | a | -a | -a | a | a | -a | -a | a | a | -a | -a | a | a | -a | -a | a | a | -a | -a | a | a | -a | -a | a | a | -a | -a | a |
| x | -v | -z | t | B | -r | -D | p | -E | -q | C | s | -A | -u | y | w | -w | -y | u | A | -s | -C | q | E | -p | D | r | -B | -t | z | v | -x |
| l | -j | -n | h | -o | -i | m | k | -k | -m | i | o | -h | n | j | -l | -l | j | n | -h | o | i | -m | -k | k | m | -i | -o | h | -n | -j | l |
| y | -s | -E | r | -z | -x | t | D | -q | A | w | -u | -C | p | -B | -v | v | B | -p | C | u | -w | -A | q | -D | -t | x | z | -r | E | s | -y |
| f | -d | g | e | -e | -g | d | -f | -f | d | -g | -e | e | g | -d | f | f | -d | g | e | -e | -g | d | -f | -f | d | -g | -e | e | g | -d | f |
| z | -p | A | y | -q | B | x | -r | C | w | -s | D | v | -t | E | u | -u | -E | t | -v | -D | s | -w | -C | r | -x | -B | q | -y | -A | p | -z |
| m | -h | l | n | -i | k | o | -j | j | -o | -k | i | -n | -l | h | -m | -m | h | -l | -n | i | -k | -o | j | -j | o | k | -i | n | l | -h | m |
| A | -r | v | -E | -w | q | -z | -B | s | -u | D | x | -p | y | C | -t | t | -C | -y | p | -x | -D | u | -s | B | z | -q | w | E | -v | r | -A |
| c | -b | b | -c | -c | b | -b | c | c | -b | b | -c | -c | b | -b | c | c | -b | b | -c | -c | b | -b | c | c | -b | b | -c | -c | b | -b | c |
| B | -u | q | -x | E | y | -r | t | -A | -C | v | -p | w | -D | -z | s | -s | z | D | -w | p | -v | C | A | -t | r | -y | -E | x | -q | u | -B |
| n | -k | h | -j | m | o | -l | i | -i | l | -o | -m | j | -h | k | -n | -n | k | -h | j | -m | -o | l | -i | i | -l | o | m | -j | h | -k | n |
| C | -x | s | -q | v | -A | -E | z | -u | p | -t | y | -D | -B | w | -r | r | -w | B | D | -y | t | -p | u | -z | E | A | -v | q | -s | x | -C |
| g | -f | e | -d | d | -e | f | -g | -g | f | -e | d | -d | e | -f | g | g | -f | e | -d | d | -e | f | -g | -g | f | -e | d | -d | e | -f | g |
| D | -A | x | -u | r | -p | s | -v | y | -B | E | C | -z | w | -t | q | -q | t | -w | z | -C | -E | B | -y | v | -s | p | -r | u | -x | A | -D |
| o | -n | m | -l | k | -j | i | -h | h | -i | j | -k | l | -m | n | -o | -o | n | -m | l | -k | j | -i | h | -h | i | -j | k | -l | m | -n | o |
| E | -D | C | -B | A | -z | y | -x | w | -v | u | -t | s | -r | q | -p | p | -q | r | -s | t | -u | v | -w | x | -y | z | -A | B | -C | D | -E |

(b) when the frequency transform is a discrete sine transform:

$$\begin{vmatrix} a & b & c & d \\ c & c & e & -c \\ d & -a & -c & b \\ b & -d & c & -a \end{vmatrix}$$

the coefficient values being selected according to the data precision from values equal to values listed in the following tables:

(a) when the frequency transform is a discrete cosine transform:

| | 7-bit | 8-bit | 9-bit | 10-bit | 11-bit | 12-bit | 13-bit | 14-bit |
|---|---|---|---|---|---|---|---|---|
| a | 128 | 256 | 512 | 1024 | 2048 | 4096 | 8192 | 16384 |
| b | 166 | 332 | 665 | 1329 | 2658 | 5317 | 10633 | 21266 |
| c | 72 | 144 | 288 | 576 | 1153 | 2306 | 4612 | 9224 |
| d | 178 | 356 | 713 | 1426 | 2852 | 5703 | 11407 | 22813 |
| e | 150 | 301 | 601 | 1203 | 2406 | 4811 | 9622 | 19244 |
| f | 100 | 200 | 399 | 798 | 1596 | 3192 | 6385 | 12769 |
| g | 36 | 71 | 143 | 285 | 570 | 1141 | 2282 | 4563 |
| h | 181 | 361 | 722 | 1445 | 2890 | 5780 | 11560 | 23120 |
| i | 172 | 345 | 689 | 1379 | 2758 | 5516 | 11032 | 22063 |
| j | 160 | 320 | 639 | 1278 | 2556 | 5113 | 10225 | 20450 |
| k | 140 | 281 | 562 | 1123 | 2246 | 4493 | 8986 | 17972 |
| l | 114 | 229 | 458 | 915 | 1830 | 3660 | 7321 | 14642 |
| m | 87 | 174 | 347 | 694 | 1389 | 2777 | 5555 | 11109 |
| n | 50 | 101 | 201 | 403 | 806 | 1612 | 3223 | 6446 |
| o | 18 | 36 | 72 | 145 | 290 | 579 | 1158 | 2316 |
| p | 181 | 361 | 722 | 1444 | 2888 | 5777 | 11553 | 23106 |
| q | 179 | 357 | 714 | 1428 | 2856 | 5713 | 11426 | 22852 |
| r | 175 | 351 | 701 | 1403 | 2806 | 5611 | 11222 | 22445 |
| s | 171 | 341 | 683 | 1365 | 2731 | 5462 | 10924 | 21848 |
| t | 164 | 328 | 656 | 1312 | 2624 | 5249 | 10497 | 20995 |
| u | 155 | 310 | 619 | 1238 | 2476 | 4952 | 9905 | 19810 |
| v | 145 | 291 | 581 | 1163 | 2325 | 4650 | 9301 | 18601 |
| w | 134 | 268 | 536 | 1071 | 2143 | 4286 | 8571 | 17143 |
| x | 123 | 246 | 491 | 982 | 1965 | 3929 | 7859 | 15718 |
| y | 108 | 216 | 433 | 866 | 1732 | 3463 | 6927 | 13853 |
| z | 92 | 184 | 367 | 734 | 1469 | 2937 | 5875 | 11749 |
| A | 77 | 154 | 308 | 615 | 1231 | 2461 | 4923 | 9846 |
| B | 62 | 124 | 247 | 494 | 988 | 1977 | 3954 | 7908 |
| C | 44 | 87 | 174 | 348 | 697 | 1393 | 2787 | 5573 |
| D | 26 | 51 | 103 | 205 | 410 | 820 | 1641 | 3281 |
| E | 7 | 15 | 30 | 59 | 118 | 236 | 473 | 946 |

| | 15-bit | 16-bit | 17-bit | 18-bit | 19-bit |
|---|---|---|---|---|---|
| a | 32768 | 65536 | 131072 | 262144 | 524288 |
| b | 42532 | 85065 | 170129 | 340259 | 680517 |
| c | 18448 | 36896 | 73791 | 147582 | 295164 |
| d | 45627 | 91253 | 182507 | 365014 | 730028 |
| e | 38489 | 76977 | 153954 | 307909 | 615817 |
| f | 25538 | 51077 | 102153 | 204306 | 408612 |
| g | 9126 | 18252 | 36504 | 73009 | 146018 |
| h | 46240 | 92479 | 184958 | 369917 | 739833 |
| i | 44126 | 88253 | 176506 | 353011 | 706022 |
| j | 40901 | 81802 | 163603 | 327207 | 654413 |
| k | 35944 | 71887 | 143775 | 287550 | 575099 |
| l | 29283 | 58566 | 117132 | 234265 | 468530 |
| m | 22219 | 44437 | 88874 | 177749 | 355498 |
| n | 12892 | 25784 | 51569 | 103137 | 206275 |
| o | 4632 | 9264 | 18528 | 37057 | 74113 |
| p | 46212 | 92424 | 184849 | 369697 | 739394 |
| q | 45704 | 91407 | 182815 | 365630 | 731260 |
| r | 44890 | 89779 | 179559 | 359118 | 718236 |
| s | 43695 | 87391 | 174781 | 349562 | 699125 |
| t | 41990 | 83979 | 167959 | 335918 | 671836 |
| u | 39619 | 79239 | 158477 | 316955 | 633909 |
| v | 37202 | 74404 | 148808 | 297616 | 595233 |
| w | 34285 | 68570 | 137140 | 274281 | 548561 |
| x | 31436 | 62871 | 125743 | 251486 | 502971 |
| y | 27706 | 55412 | 110825 | 221650 | 443299 |

-continued

| | 15-bit | 16-bit | 17-bit | 18-bit | 19-bit |
|---|---|---|---|---|---|
| z | 23498 | 46997 | 93993 | 187986 | 375972 |
| A | 19692 | 39384 | 78767 | 157535 | 315070 |
| B | 15816 | 31631 | 63263 | 126525 | 253051 |
| C | 11146 | 22292 | 44584 | 89168 | 178337 |
| D | 6562 | 13124 | 26248 | 52497 | 104993 |
| E | 1891 | 3782 | 7564 | 15129 | 30258 |

| | 20-bit | 21-bit | 22-bit | 23-bit | 24-bit |
|---|---|---|---|---|---|
| a | 1048576 | 2097152 | 4194304 | 8388608 | 16777216 |
| b | 1361035 | 2722070 | 5444140 | 10888280 | 21776560 |
| c | 590328 | 1180657 | 2361314 | 4722627 | 9445255 |
| d | 1460056 | 2920112 | 5840224 | 11680448 | 23360895 |
| e | 1231635 | 2463269 | 4926539 | 9853077 | 19706155 |
| f | 817225 | 1634450 | 3268899 | 6537799 | 13075597 |
| g | 292035 | 584070 | 1168141 | 2336282 | 4672564 |
| h | 1479667 | 2959333 | 5918667 | 11837334 | 23674667 |
| i | 1412045 | 2824090 | 5648179 | 11296358 | 22592717 |
| j | 1308827 | 2617653 | 5235307 | 10470613 | 20941227 |
| k | 1150199 | 2300397 | 4600795 | 9201590 | 18403179 |
| l | 937060 | 1874119 | 3748238 | 7496477 | 14992954 |
| m | 710995 | 1421991 | 2843981 | 5687962 | 11375925 |
| n | 412549 | 825098 | 1650196 | 3300393 | 6600785 |
| o | 148227 | 296454 | 592908 | 1185815 | 2371630 |
| p | 1478788 | 2957576 | 5915152 | 11830305 | 23660609 |
| q | 1462520 | 2925040 | 5850080 | 11700160 | 23400319 |
| r | 1436472 | 2872944 | 5745888 | 11491775 | 22983550 |
| s | 1398249 | 2796498 | 5592996 | 11185992 | 22371984 |
| t | 1343671 | 2687342 | 5374684 | 10749368 | 21498736 |
| u | 1267818 | 2535636 | 5071272 | 10142545 | 20285089 |
| v | 1190466 | 2380931 | 4761862 | 9523724 | 19047449 |
| w | 1097123 | 2194246 | 4388491 | 8776982 | 17553965 |
| x | 1005942 | 2011884 | 4023769 | 8047537 | 16095074 |
| y | 886598 | 1773197 | 3546394 | 7092787 | 14185574 |
| z | 751944 | 1503889 | 3007778 | 6015555 | 12031111 |
| A | 630139 | 1260278 | 2520556 | 5041112 | 10082224 |
| B | 506101 | 1012202 | 2024405 | 4048809 | 8097618 |
| C | 356674 | 713348 | 1426696 | 2853391 | 5706783 |
| D | 209987 | 419973 | 839947 | 1679894 | 3359787 |
| E | 60515 | 121030 | 242061 | 484122 | 968243 |

(b) when the frequency transform is a discrete sine transform:

| | 7-bit | 8-bit | 9-bit | 10-bit | 11-bit | 12-bit | 13-bit | 14-bit |
|---|---|---|---|---|---|---|---|---|
| a | 58 | 116 | 232 | 464 | 928 | 1856 | 3712 | 7424 |
| b | 110 | 220 | 440 | 880 | 1760 | 3520 | 7040 | 14081 |
| c | 148 | 295 | 590 | 1181 | 2362 | 4723 | 9447 | 18893 |
| d | 168 | 336 | 672 | 1344 | 2688 | 5376 | 10753 | 21505 |
| e | 0 | 0 | 0 | 0 | 0 | 0 | 0 | 0 |

| | 15-bit | 16-bit | 17-bit | 18-bit | 19-bit |
|---|---|---|---|---|---|
| a | 14849 | 29698 | 59396 | 118791 | 237583 |
| b | 28162 | 56323 | 112647 | 225294 | 450588 |
| c | 37787 | 75573 | 151146 | 302292 | 604584 |
| d | 43011 | 86021 | 172043 | 344085 | 688170 |
| e | 0 | 0 | 0 | 0 | 0 |

| | 20-bit | 21-bit | 22-bit | 23-bit | 24-bit |
|---|---|---|---|---|---|
| a | 475165 | 950330 | 1900660 | 3801320 | 7602640 |
| b | 901175 | 1802350 | 3604700 | 7209400 | 14418800 |
| c | 1209169 | 2418337 | 4836675 | 9673350 | 19346700 |
| d | 1376340 | 2752680 | 5505360 | 11010720 | 22021440 |
| e | 0 | 0 | 0 | 0 | 0 |

the frequency transform circuitry further configured to set the data precision of the transform matrix to three bits less than a bit depth of the video data values but greater than six bits.

7. The apparatus according to claim 6, wherein the coefficient values are equal to the selected values from the respective table.

8. The apparatus according to claim 6, wherein, for a discrete cosine transform of an array of N×N values, where N is a power of 2 smaller than 32, the subset $M_N[x][y]$ of values is defined by:

$$M_N[x][y]=M_{32}[x][(2^{(5-\log_2(N))})y] \text{ for } x,y=0\ldots(N-1).$$

9. The apparatus according to claim 8, wherein

N is 4, 8 or 16.

10. A video data capture, transmission, display or storage apparatus comprising the apparatus according to claim 6.

11. A video data decoding method for decoding an array of video data values, the decoding method comprising:

using an inverse transform that has a data precision of six bits to decode the array of video data values, wherein the array of video data values have been encoded by:

frequency-transforming video data values according to a frequency transform; and generating an array of frequency-transformed values by a matrix-multiplication process using a transform matrix having a data precision greater than six bits, the transform matrix being matched to the inverse transform having the data precision of six bits that is used to decode the video data values, the transform matrix having coefficients defined by at least a subset of the following values, wherein each letter indicates a respective coefficient value:

(a) when the frequency transform is a discrete cosine transform:

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| a | a | a | a | a | a | a | a | a | a | a | a | a | a | a | a | a | a | a | a | a | a | a | a | a | a | a | a | a | a | a | a |
| p | q | r | s | t | u | v | w | x | y | z | A | B | C | D | E | -E | -D | -C | -B | -A | -z | -y | -x | -w | -v | -u | -t | -s | -r | -q | -p |
| h | i | j | k | l | m | n | o | -o | -n | -m | -l | -k | -j | -i | -h | -h | -i | -j | -k | -l | -m | -n | -o | o | n | m | l | k | j | i | h |
| q | t | w | z | C | -E | -B | -y | -v | -s | -p | -r | -u | -x | -A | -D | D | A | x | u | r | p | s | v | y | B | E | -C | -z | -w | -t | -q |
| d | e | f | g | -g | -f | -e | -d | -d | -e | -f | -g | g | f | e | d | d | e | f | g | -g | -f | -e | -d | -d | -e | -f | -g | g | f | e | d |
| r | w | B | -D | -y | -t | -p | -u | -z | -E | A | v | q | s | x | C | -C | -x | -s | -q | -v | -A | E | z | u | p | t | y | D | -B | -w | -r |
| i | l | o | -m | -j | -h | -k | -n | n | k | h | j | m | -o | -l | -i | -i | -l | -o | m | j | h | k | n | -n | -k | -h | -j | -m | o | l | i |
| s | z | -D | -w | -p | -v | -C | A | t | r | V | -E | -x | -q | -u | -B | B | u | q | x | E | -y | -r | -t | -A | C | v | p | w | D | -z | -s |
| b | c | -c | -b | -b | -c | c | b | b | c | -c | -b | -b | -c | c | b | b | c | -c | -b | -b | -c | c | b | b | c | -c | -b | -b | -c | c | b |
| t | C | -y | -p | -x | D | u | s | B | -z | -q | -w | E | v | r | A | -A | -r | -v | -E | w | q | z | -B | -s | -u | -D | x | p | y | -C | -t |
| j | o | -k | -i | -n | l | h | m | -m | -h | -l | n | i | k | -o | -j | -j | -o | k | i | n | -l | -h | -m | m | h | l | -n | -i | -k | o | j |
| u | -E | -t | -v | D | s | w | -C | -r | -x | B | q | y | -A | -p | -z | z | p | A | -y | -q | -B | x | r | C | -w | -s | -D | v | t | E | -u |
| e | -g | -d | -f | f | d | g | -e | -e | g | d | f | -f | -d | -g | e | e | -g | -d | -f | f | d | g | -e | -e | g | d | f | -f | -d | -g | e |
| v | -B | -p | -C | u | w | -A | -q | -D | t | x | -z | -r | -E | s | y | -y | -s | E | r | z | -x | -t | D | q | A | -w | -u | C | p | B | -v |
| k | -m | -i | o | h | n | -j | -l | l | j | -n | -h | -o | i | m | -k | -k | m | i | -o | -h | -n | j | l | -l | -j | n | h | o | -i | -m | k |
| w | -y | -u | A | s | -C | -q | E | p | D | -r | -B | t | z | -v | -x | x | v | -z | -t | B | r | -D | -p | -E | q | C | -s | -A | u | y | -w |
| a | -a | -a | a | a | -a | -a | a | a | -a | -a | a | a | -a | -a | a | a | -a | -a | a | a | -a | -a | a | a | -a | -a | a | a | -a | -a | a |
| x | -v | -z | t | B | -r | -D | p | -E | -q | C | s | -A | -u | y | w | -w | -y | u | A | -s | -C | q | E | -p | D | r | -B | -t | z | v | -x |
| l | -j | -n | h | -o | -i | m | k | -k | -m | i | o | -h | n | j | -l | -l | j | n | -h | o | i | -m | -k | k | m | -i | -o | h | -n | -j | l |
| y | -s | -E | r | -z | -x | t | D | -q | A | w | -u | -C | p | -B | -v | v | B | -p | C | u | -w | -A | q | -D | -t | x | z | -r | E | s | -y |
| f | -d | g | e | -e | -g | d | -f | -f | d | -g | -e | e | g | -d | f | f | -d | g | e | -e | -g | d | -f | -f | d | -g | -e | e | g | -d | f |
| z | -p | A | y | -q | B | x | -r | C | w | -s | D | v | -t | E | u | -u | -E | t | -v | -D | s | -w | -C | r | -x | -B | q | -y | -A | p | -z |
| m | -h | l | n | -i | k | o | -j | j | -o | -k | i | -n | -l | h | -m | -m | h | -l | -n | i | -k | -o | j | -j | o | k | -i | n | l | -h | m |
| A | -r | v | -E | -w | q | -z | -B | s | -u | D | x | -p | y | C | -t | t | -C | -y | p | -x | -D | u | -s | B | z | -q | w | E | -v | r | -A |
| c | -b | b | -c | -c | b | -b | c | c | -b | b | -c | -c | b | -b | c | c | -b | b | -c | -c | b | -b | c | c | -b | b | -c | -c | b | -b | c |
| B | -u | q | -x | E | y | -r | t | -A | -C | v | -p | w | -D | -z | s | -s | z | D | -w | p | -v | C | A | -t | r | -y | -E | x | -q | u | -B |
| n | -k | h | -j | m | o | -l | i | -i | l | -o | -m | j | -h | k | -n | -n | k | -h | j | -m | -o | l | -i | i | -l | o | m | -j | h | -k | n |
| C | -x | s | -q | v | -A | -E | z | -u | p | -t | y | -D | -B | w | -r | r | -w | B | D | -y | t | -p | u | -z | E | A | -v | q | -s | x | -C |
| g | -f | e | -d | d | -e | f | -g | -g | f | -e | d | -d | e | -f | g | g | -f | e | -d | d | -e | f | -g | -g | f | -e | d | -d | e | -f | g |
| D | -A | x | -u | r | -p | s | -v | y | -B | E | C | -z | w | -t | q | -q | t | -w | z | -C | -E | B | -y | v | -s | p | -r | u | -x | A | -D |
| o | -n | m | -l | k | -j | i | -h | h | -i | j | -k | l | -m | n | -o | -o | n | -m | l | -k | j | -i | h | -h | i | -j | k | -l | m | -n | o |
| E | -D | C | -B | A | -z | y | -x | w | -v | u | -t | s | -r | q | -p | p | -q | r | -s | t | -u | v | -w | x | -y | z | -A | B | -C | D | -E |

(b) when the frequency transform is a discrete sine transform:

$$\begin{bmatrix} a & b & c & d \\ c & c & e & -c \\ d & -a & -c & b \\ b & -d & c & -a \end{bmatrix}$$

the coefficient values being selected according to the data precision from values equal to values listed in the following tables:

(a) when the frequency transform is a discrete cosine transform:

| | 7-bit | 8-bit | 9-bit | 10-bit | 11-bit | 12-bit | 13-bit | 14-bit |
|---|---|---|---|---|---|---|---|---|
| a | 128 | 256 | 512 | 1024 | 2048 | 4096 | 8192 | 16384 |
| b | 166 | 332 | 665 | 1329 | 2658 | 5317 | 10633 | 21266 |
| c | 72 | 144 | 288 | 576 | 1153 | 2306 | 4612 | 9224 |
| d | 178 | 356 | 713 | 1426 | 2852 | 5703 | 11407 | 22813 |
| e | 150 | 301 | 601 | 1203 | 2406 | 4811 | 9622 | 19244 |
| f | 100 | 200 | 399 | 798 | 1596 | 3192 | 6385 | 12769 |
| g | 36 | 71 | 143 | 285 | 570 | 1141 | 2282 | 4563 |
| h | 181 | 361 | 722 | 1445 | 2890 | 5780 | 11560 | 23120 |
| i | 172 | 345 | 689 | 1379 | 2758 | 5516 | 11032 | 22063 |
| j | 160 | 320 | 639 | 1278 | 2556 | 5113 | 10225 | 20450 |
| k | 140 | 281 | 562 | 1123 | 2246 | 4493 | 8986 | 17972 |
| l | 114 | 229 | 458 | 915 | 1830 | 3660 | 7321 | 14642 |
| m | 87 | 174 | 347 | 694 | 1389 | 2777 | 5555 | 11109 |
| n | 50 | 101 | 201 | 403 | 806 | 1612 | 3223 | 6446 |
| o | 18 | 36 | 72 | 145 | 290 | 579 | 1158 | 2316 |
| p | 181 | 361 | 722 | 1444 | 2888 | 5777 | 11553 | 23106 |
| q | 179 | 357 | 714 | 1428 | 2856 | 5713 | 11426 | 22852 |
| r | 175 | 351 | 701 | 1403 | 2806 | 5611 | 11222 | 22445 |
| s | 171 | 341 | 683 | 1365 | 2731 | 5462 | 10924 | 21848 |
| t | 164 | 328 | 656 | 1312 | 2624 | 5249 | 10497 | 20995 |
| u | 155 | 310 | 619 | 1238 | 2476 | 4952 | 9905 | 19810 |
| v | 145 | 291 | 581 | 1163 | 2325 | 4650 | 9301 | 18601 |
| w | 134 | 268 | 536 | 1071 | 2143 | 4286 | 8571 | 17143 |
| x | 123 | 246 | 491 | 982 | 1965 | 3929 | 7859 | 15718 |
| y | 108 | 216 | 433 | 866 | 1732 | 3463 | 6927 | 13853 |
| z | 92 | 184 | 367 | 734 | 1469 | 2937 | 5875 | 11749 |
| A | 77 | 154 | 308 | 615 | 1231 | 2461 | 4923 | 9846 |
| B | 62 | 124 | 247 | 494 | 988 | 1977 | 3954 | 7908 |
| C | 44 | 87 | 174 | 348 | 697 | 1393 | 2787 | 5573 |
| D | 26 | 51 | 103 | 205 | 410 | 820 | 1641 | 3281 |
| E | 7 | 15 | 30 | 59 | 118 | 236 | 473 | 946 |

| | 15-bit | 16-bit | 17-bit | 18-bit | 19-bit |
|---|---|---|---|---|---|
| a | 32768 | 65536 | 131072 | 262144 | 524288 |
| b | 42532 | 85065 | 170129 | 340259 | 680517 |
| c | 18448 | 36896 | 73791 | 147582 | 295164 |
| d | 45627 | 91253 | 182507 | 365014 | 730028 |
| e | 38489 | 76977 | 153954 | 307909 | 615817 |
| f | 25538 | 51077 | 102153 | 204306 | 408612 |
| g | 9126 | 18252 | 36504 | 73009 | 146018 |
| h | 46240 | 92479 | 184958 | 369917 | 739833 |
| i | 44126 | 88253 | 176506 | 353011 | 706022 |
| j | 40901 | 81802 | 163603 | 327207 | 654413 |
| k | 35944 | 71887 | 143775 | 287550 | 575099 |
| l | 29283 | 58566 | 117132 | 234265 | 468530 |
| m | 22219 | 44437 | 88874 | 177749 | 355498 |
| n | 12892 | 25784 | 51569 | 103137 | 206275 |
| o | 4632 | 9264 | 18528 | 37057 | 74113 |
| p | 46212 | 92424 | 184849 | 369697 | 739394 |
| q | 45704 | 91407 | 182815 | 365630 | 731260 |
| r | 44890 | 89779 | 179559 | 359118 | 718236 |
| s | 43695 | 87391 | 174781 | 349562 | 699125 |
| t | 41990 | 83979 | 167959 | 335918 | 671836 |
| u | 39619 | 79239 | 158477 | 316955 | 633909 |
| v | 37202 | 74404 | 148808 | 297616 | 595233 |

-continued

| | 15-bit | 16-bit | 17-bit | 18-bit | 19-bit |
|---|---|---|---|---|---|
| w | 34285 | 68570 | 137140 | 274281 | 548561 |
| x | 31436 | 62871 | 125743 | 251486 | 502971 |
| y | 27706 | 55412 | 110825 | 221650 | 443299 |
| z | 23498 | 46997 | 93993 | 187986 | 375972 |
| A | 19692 | 39384 | 78767 | 157535 | 315070 |
| B | 15816 | 31631 | 63263 | 126525 | 253051 |
| C | 11146 | 22292 | 44584 | 89168 | 178337 |
| D | 6562 | 13124 | 26248 | 52497 | 104993 |
| E | 1891 | 3782 | 7564 | 15129 | 30258 |

| | 20-bit | 21-bit | 22-bit | 23-bit | 24-bit |
|---|---|---|---|---|---|
| a | 1048576 | 2097152 | 4194304 | 8388608 | 16777216 |
| b | 1361035 | 2722070 | 5444140 | 10888280 | 21776560 |
| c | 590328 | 1180657 | 2361314 | 4722627 | 9445255 |
| d | 1460056 | 2920112 | 5840224 | 11680448 | 23360895 |
| e | 1231635 | 2463269 | 4926539 | 9853077 | 19706155 |
| f | 817225 | 1634450 | 3268899 | 6537799 | 13075597 |
| g | 292035 | 584070 | 1168141 | 2336282 | 4672564 |
| h | 1479667 | 2959333 | 5918667 | 11837334 | 23674667 |
| i | 1412045 | 2824090 | 5648179 | 11296358 | 22592717 |
| j | 1308827 | 2617653 | 5235307 | 10470613 | 20941227 |
| k | 1150199 | 2300397 | 4600795 | 9201590 | 18403179 |
| l | 937060 | 1874119 | 3748238 | 7496477 | 14992954 |
| m | 710995 | 1421991 | 2843981 | 5687962 | 11375925 |
| n | 412549 | 825098 | 1650196 | 3300393 | 6600785 |
| o | 148227 | 296454 | 592908 | 1185815 | 2371630 |
| p | 1478788 | 2957576 | 5915152 | 11830305 | 23660609 |
| q | 1462520 | 2925040 | 5850080 | 11700160 | 23400319 |
| r | 1436472 | 2872944 | 5745888 | 11491775 | 22983550 |
| s | 1398249 | 2796498 | 5592996 | 11185992 | 22371984 |
| t | 1343671 | 2687342 | 5374684 | 10749368 | 21498736 |
| u | 1267818 | 2535636 | 5071272 | 10142545 | 20285089 |
| v | 1190466 | 2380931 | 4761862 | 9523724 | 19047449 |
| w | 1097123 | 2194246 | 4388491 | 8776982 | 17553965 |
| x | 1005942 | 2011884 | 4023769 | 8047537 | 16095074 |
| y | 886598 | 1773197 | 3546394 | 7092787 | 14185574 |
| z | 751944 | 1503889 | 3007778 | 6015555 | 12031111 |
| A | 630139 | 1260278 | 2520556 | 5041112 | 10082224 |
| B | 506101 | 1012202 | 2024405 | 4048809 | 8097618 |
| C | 356674 | 713348 | 1426696 | 2853391 | 5706783 |
| D | 209987 | 419973 | 839947 | 1679894 | 3359787 |
| E | 60515 | 121030 | 242061 | 484122 | 968243 |

(b) when the frequency transform is a discrete sine transform:

| | 7-bit | 8-bit | 9-bit | 10-bit | 11-bit | 12-bit | 13-bit | 14-bit |
|---|---|---|---|---|---|---|---|---|
| a | 58 | 116 | 232 | 464 | 928 | 1856 | 3712 | 7424 |
| b | 110 | 220 | 440 | 880 | 1760 | 3520 | 7040 | 14081 |
| c | 148 | 295 | 590 | 1181 | 2362 | 4723 | 9447 | 18893 |
| d | 168 | 336 | 672 | 1344 | 2688 | 5376 | 10753 | 21505 |
| e | 0 | 0 | 0 | 0 | 0 | 0 | 0 | 0 |

| | 15-bit | 16-bit | 17-bit | 18-bit | 19-bit |
|---|---|---|---|---|---|
| a | 14849 | 29698 | 59396 | 118791 | 237583 |
| b | 28162 | 56323 | 112647 | 225294 | 450588 |
| c | 37787 | 75573 | 151146 | 302292 | 604584 |
| d | 43011 | 86021 | 172043 | 344085 | 688170 |
| e | 0 | 0 | 0 | 0 | 0 |

| | 20-bit | 21-bit | 22-bit | 23-bit | 24-bit |
|---|---|---|---|---|---|
| a | 475165 | 950330 | 1900660 | 3801320 | 7602640 |
| b | 901175 | 1802350 | 3604700 | 7209400 | 14418800 |
| c | 1209169 | 2418337 | 4836675 | 9673350 | 19346700 |
| d | 1376340 | 2752680 | 5505360 | 11010720 | 22021440 |
| e | 0 | 0 | 0 | 0 | 0 |

wherein the selecting further comprising setting the data precision of the transform matrix to three bits less than a bit depth of the video data values but greater than six bits.

* * * * *